(12) United States Patent
Eoh et al.

(10) Patent No.: US 11,119,501 B2
(45) Date of Patent: Sep. 14, 2021

(54) MOVING ROBOT AND CONTROL METHOD FOR THE SAME

(71) Applicant: LG ELECTRONICS INC., Seoul (KR)

(72) Inventors: Gyuho Eoh, Seoul (KR); Dongki Noh, Seoul (KR); Taekyeong Lee, Seoul (KR); Seungwook Lim, Seoul (KR)

(73) Assignee: LG ETECTRONICS INC., Seoul (KR)

( * ) Notice: Subject to any disclaimer, the term of this patent is extended or adjusted under 35 U.S.C. 154(b) by 308 days.

(21) Appl. No.: 16/225,515

(22) Filed: Dec. 19, 2018

(65) Prior Publication Data

US 2019/0196497 A1   Jun. 27, 2019

(30) Foreign Application Priority Data

Dec. 21, 2017   (KR) .......................... 10-2017-0177359

(51) Int. Cl.
*G05D 1/00* (2006.01)
*G05D 1/02* (2020.01)
*G06F 16/29* (2019.01)
*G01C 21/32* (2006.01)

(52) U.S. Cl.
CPC ........... *G05D 1/0274* (2013.01); *G01C 21/32* (2013.01); *G05D 1/0088* (2013.01); *G05D 1/0246* (2013.01); *G06F 16/29* (2019.01); *G05D 2201/0203* (2013.01)

(58) Field of Classification Search
CPC .. G05D 1/0274; G05D 1/0246; G05D 1/0088; G05D 2201/0203; G06F 16/29; G01C 21/32; G01C 22/00; G06K 9/52

USPC .............. 701/23; 446/301; 901/17; 700/245
See application file for complete search history.

(56) References Cited

U.S. PATENT DOCUMENTS

| | | | | |
|---|---|---|---|---|
| 2005/0065655 A1* | 3/2005 | Hong | .................. | G05D 1/0234 700/245 |
| 2010/0070125 A1* | 3/2010 | Lee | .......................... | G06T 7/73 701/28 |
| 2012/0089295 A1* | 4/2012 | Ahn | ..................... | G05D 1/0242 701/28 |
| 2016/0089783 A1* | 3/2016 | Noh | .................... | G05D 1/0246 382/153 |

(Continued)

FOREIGN PATENT DOCUMENTS

| | | |
|---|---|---|
| EP | 1 517 210 | 3/2005 |
| EP | 3 002 656 | 4/2016 |

(Continued)

OTHER PUBLICATIONS

Korean Office Action dated Nov. 30, 2018 issued in Application No. 10-2017-0177359.

(Continued)

*Primary Examiner* — Shardul D Patel
(74) *Attorney, Agent, or Firm* — Ked & Associates. LLP

(57) ABSTRACT

A method of controlling a moving-robot includes creating a plurality of maps having different generation-time information through a plurality of driving processes; choosing any one of the plurality of maps according to a certain map choosing algorithm based on current time information and the generation-time information, and attempting location recognition based on the chosen map.

19 Claims, 14 Drawing Sheets

(56) References Cited

U.S. PATENT DOCUMENTS

| | | | | |
|---|---|---|---|---|
| 2016/0135655 A1* | 5/2016 | Ahn | ............... | G05D 1/0044 |
| | | | | 134/56 R |
| 2017/0225321 A1* | 8/2017 | Deyle | ............... | B25J 9/1679 |
| 2017/0265703 A1* | 9/2017 | Park | ............... | A47L 9/28 |
| 2017/0273527 A1* | 9/2017 | Han | ............... | A47L 9/009 |
| 2017/0358201 A1* | 12/2017 | Govers | ............... | G05D 1/0248 |
| 2018/0074508 A1* | 3/2018 | Kleiner | ............... | A47L 9/2852 |
| 2018/0253108 A1* | 9/2018 | Heinla | ............... | G05D 1/0088 |
| 2018/0299899 A1* | 10/2018 | Suvarna | ............... | H04W 64/00 |
| 2018/0344116 A1* | 12/2018 | Schriesheim | ............... | A47L 9/2857 |
| 2019/0025838 A1* | 1/2019 | Artes | ............... | G05D 1/0044 |
| 2019/0167059 A1* | 6/2019 | Brown | ............... | A47L 9/2805 |
| 2019/0176321 A1* | 6/2019 | Afrouzi | ............... | G05D 1/0044 |
| 2019/0324468 A1* | 10/2019 | Liss | ............... | G05D 1/0274 |

FOREIGN PATENT DOCUMENTS

| | | |
|---|---|---|
| JP | 2010-191502 | 9/2010 |
| KR | 10-2009-0061355 | 6/2009 |
| KR | 10-2010-0104581 | 9/2010 |

OTHER PUBLICATIONS

European Search Report dated Mar. 20, 2019 issued in Application No. 18214365.1.

* cited by examiner

MOVING ROBOT AND CONTROL METHOD FOR THE SAME

CROSS-REFERENCE TO RELATED APPLICATION(S)

This application claims priority under 35 U.S.C. § 119 to Korean Application No. 10-2017-0177359 filed on Dec. 21, 2017, whose entire disclosure is hereby incorporated by reference.

BACKGROUND

1. Field

The present invention relates to a moving-robot and a control method for the moving-robot, and more particularly, to a technology which allows a moving-robot to learn a map or to recognize a location on the map.

2. Background

Robots have been developed for industrial use and have been part of factory automation. In recent years, the application field of robots has been expanded, so that medical robots, aerospace robots, and the like have been developed and household robots that can be used in ordinary homes have been manufactured. Among these robots, a robot capable of driving under its own power is called a moving-robot. A typical example of a moving-robot used in home is a robot cleaner (or autonomous cleaner).

In order to allow the moving-robot to move accurately to a desired destination, there is a method of detecting an infrared (IR) signal transmitted from a destination such as a charging stand. However, this just enables to move to a restricted destination that transmits an infrared signal or the like, and it is not possible to move to every destination. In addition, there is a problem that when the moving-robot cannot detect a transmitted infrared ray due to a distance or an obstacle, the robot may roam around so as to find the destination. Therefore, in order to move to any location in a driving area, it is required to be able to determine the current location of the moving-robot on the map.

To this end, conventionally, various methods of consistently determining the current location are known based on driving information (information on the moving direction and the moving speed or a comparison of floor pictures and the like photographed continuously) at the immediately preceding location of the moving-robot during the continuous movement of the moving-robot. In addition, various methods are known in which the moving-robot learns a map by itself.

However, when the location of the driving moving-robot is forcibly changed due to external factors, the moving-robot cannot recognize the unknown current location based on the driving information at the immediately preceding location. For example, a 'kidnapping' situation in which a user lifts and transfers a driving moving-robot may occur.

Although the moving-robot can use the infrared signal transmitted from a specific point in order to recognize (to localize) the current location on the map even in the 'jumping situation' including the kidnapping situation, the above mentioned problem still exists. In addition, there is a method of using a laser sensor or an ultrasonic sensor to recognize the current location in the jumping situation, but there is a restriction in that the cost is greatly increased and more specific information relating to the surrounding environment cannot be acquired.

Accordingly, the related art (Korean Unexamined Published Patent Application No. 10-2010-0104581) discloses a technology of localize an unknown current location by using an image photographed through a camera in a current location. The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 11 shows an image acquired in the process S101 and a plurality of feature points (f1, f2, f3, f4, f5, f6, f7) in the image, and shows a diagram of creating a descriptor ($\vec{F1}, \vec{F2}, \vec{F3}, \ldots, \vec{F7}$) which is an n-dimensional vector corresponding to the plurality of feature points (f1, f2, f3, ..., f7) respectively, in the process S106;

FIG. 15 is a conceptual diagram illustrating configuration information of map information D10 corresponding to the first map Ma; FIG. 16 shows an image acquired in the step S31 and a plurality of feature points (h1, h2, h3, h4, h5, h6, h7) in the image, and shows a diagram of creating descriptors ($\vec{H1}, \vec{H2}, \vec{H3}, \vec{H4}, \vec{H5}, \vec{H6}, \vec{H7}$) which is an n-dimensional vector corresponding to the plurality of feature points (h1, h2, h3, h4, h5, h6, h7) respectively, in the step S32.

DETAILED DESCRIPTION

Figure 1:
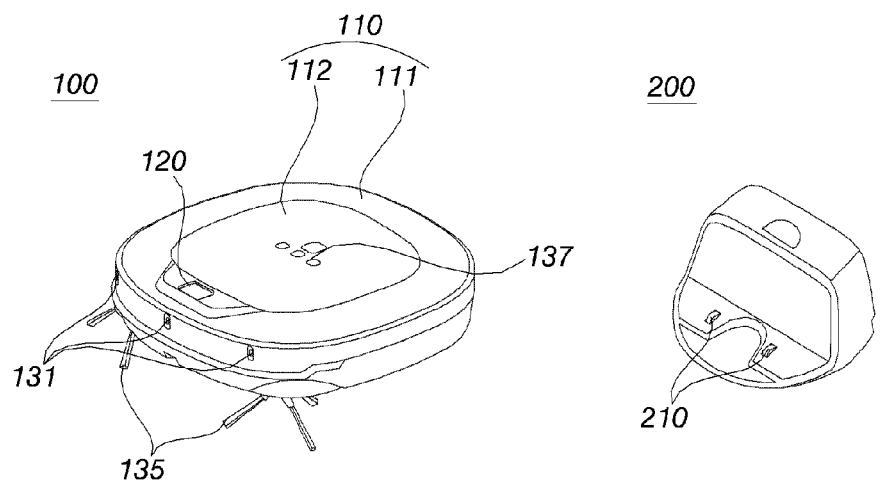
FIG. 1 is a perspective view illustrating a moving-robot and a charging stand for charging the moving-robot according to an embodiment of the present invention.
Figure 2:
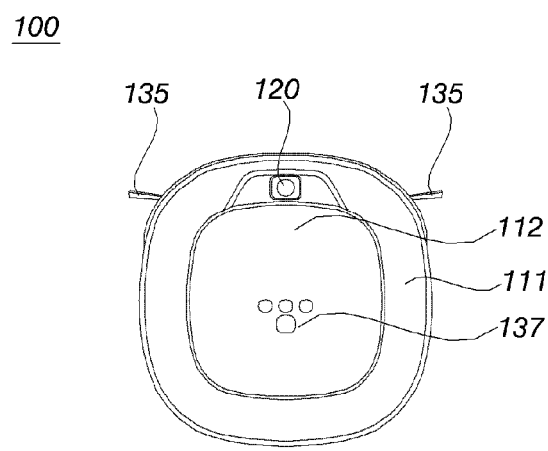
FIG. 2 is a view illustrating a top portion of the moving-robot shown in FIG. 1.
Figure 3:
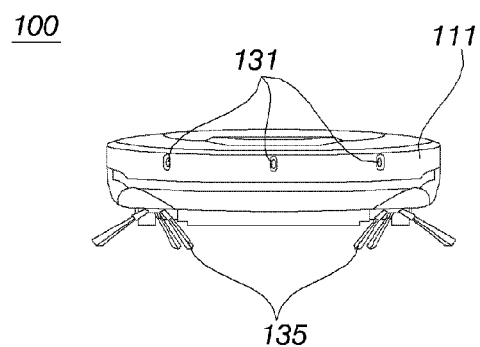
FIG. 3 is a view illustrating a front portion of the moving-robot shown in FIG. 1.
Figure 4:
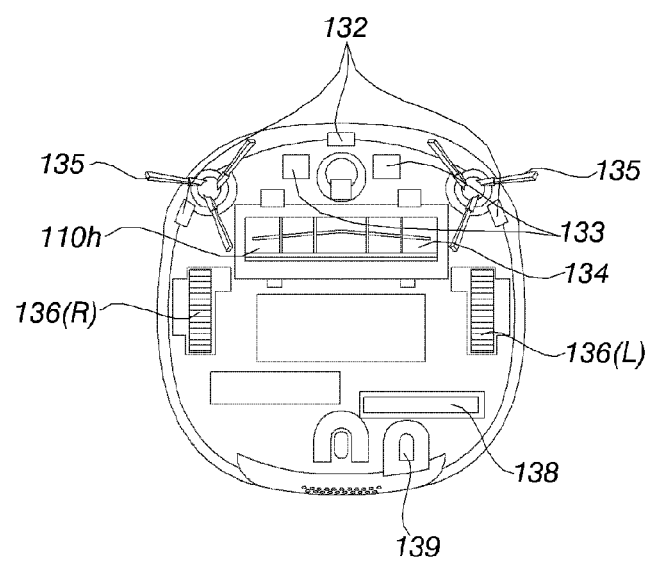
FIG. 4 is a view illustrating a bottom portion of the moving-robot shown in FIG. 1.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. The main terms used throughout this description are as follows.

'To create' means to generate new data that is not previously stored. 'Create object B based on object A' means that object B is created as a result of information processing of the object A which is an input value.

'To compare object A with object B' means that the degree of similarity between object A and object B is determined through a well-known technology or an embodiment disclosed in the description of the present invention.

'To calculate' means to compute mathematical data and create data which is the result value.

'To choose' means to decide one of a plurality of objects.

When object B is decided for object A, it is said that object A corresponds to object B. (For example, each node corresponds to each image). When object A corresponds to object B and object B corresponds to object C, it can be said that object A corresponds to object C.

When at least one element of group B is decided for each element of group A, it is said that group A corresponds to group B. (For example, a descriptor group corresponds to a label descriptor group). 'Correspondence' means at least one of univalent correspondence, one-to-many correspondence, and one-to-one correspondence. When object A corresponds to a single object B, it is said that object A achieves univalent-correspondence to object B. When each element of group A corresponds to only a single element of group B, it is said that group A achieves univalent-correspondence to group B. When object A corresponds to a plurality of objects B, it is said that object A achieves one-to-many correspondence to object B. When at least one element of group A corresponds to a plurality of elements of group B, it is said that group A achieves one-to-many correspondence to group B. When a single object A corresponds to a single object B, it is said that object A achieves one-to-one correspondence to object B. When the numbers of elements of group A and group B are equal to each other and each element of group A corresponds to a different element of group B, it is said that group A achieves one-to-one correspondence to group B. For example, when a feature point B is extracted from any one acquisition image A and a descriptor C is created based on the feature point B, the image A achieves univalent-correspondence to the descriptor C. For example, when a plurality of feature points B and C are extracted from any one acquisition image A and a plurality of descriptors C and D are created based on the plurality of feature points B and C, the image A achieves one-to-many correspondence to a plurality of descriptors C and D. For example, when the numbers of a plurality of nodes and a plurality of images are equal to each other and each node corresponds to a different image, it is said that the plurality of nodes achieve one-to-one correspondence to the plurality of images.

To create a relationship in which object A corresponds to object B is said that 'to match object A to object B'. For example, the image is matched to the node.

The 'Jumping situation' means a situation in which the moving-robot is moved in a state in which it is impossible to trace the movement route on the map. Specifically, the jumping situation may occur when the moving-robot is moved in a state in which a driving displacement cannot be measured by a driving displacement measuring unit 165 which will be described later. As an example of the jumping situation, there is a kidnapping situation in which a user forcibly lifts and moves a driving moving-robot, or a situation in which a moving-robot is forcibly moved in a state where the power of the moving-robot is turned off.

'Basic learning' means the process of creating a map by using information acquired in a driving area.

'Driving area' is the area of the outside world where the moving-robot drives.

"Point" means any one location within the driving area.

'Driving obstacle factor' is a factor that restricts the driving of the moving-robot, and means a factor on the driving area detected by the moving-robot. For example, the driving obstacle factor includes the outer surface of an obstacle (a wall or a body placed on the floor) and the starting part of a cliff. For example, the moving-robot may detect the driving obstacle factor by using an obstacle detection sensor 131, a cliff detection sensor 132, a lower camera sensor 139, an image acquisition unit 120 which will be described later, and other known means.

'Map' is data stored in a certain format of certain information of the driving area, and is a map created through the map creation step.

"Node" means data indicating any one location on a map corresponding to the point.

'Node information' means various data corresponding to the node.

'Node map' means a map containing a plurality of nodes.

'Border information' means data indicating a location on the map corresponding to the driving obstacle factor.

'Border map' means data including a plurality of border information. The border map may correspond to a shape of the driving area.

'Environmental information' means various information of the outside world that the moving-robot detects. For example, the environmental information may include a distance to an image and/or a body. The environmental information may include information that varies depending on illuminance around a moving-robot 100.

'Image' means an image photographed and acquired by the moving-robot 100. 'Recognition image' means an image acquired at the current location to recognize the current location on the map.

'Image corresponding to node' means an image acquired at a point corresponding to a node.

'Feature point' is one of several features of an image, and means a partial image in the image. 'Recognition feature point' is one of several features of the recognition image, and means a partial image in the recognition image.

'Descriptor' means data in a certain format for indicating the feature point, and means mathematical data of a format capable of calculating distance or similarity between the descriptors. For example, the descriptor may be an n-dimensional vector (n is a natural number) or data in a matrix format.

When the descriptor can be represented by an n-dimensional vector, 'distance' between two descriptors $(\vec{A}, \vec{B})$ means a distance d between n-dimensional vectors and may be calculated by the following Equation 1 (where n is a natural number).

$$d = |\vec{A} - \vec{B}| \qquad \text{[Equation 1]}$$

When the descriptor can be represented by an n-dimensional vector, an 'average value'$(\vec{A})$(n-dimensional vector) of x (where x is a natural number) descriptors $\vec{A1}, \vec{A2}, \vec{A3}, \ldots, \vec{Ax}$ may be calculated by the following Equation 2 (where x and n are natural numbers).

$$\vec{A} = \frac{\vec{A1} + \vec{A2} + \vec{A3} + \ldots + \vec{Ax}}{x} \qquad \text{[Equation 2]}$$

'Recognition descriptor' means data of a certain format for representing the recognition feature point, and means data of the same format as the descriptor.

The plurality of descriptors in the image means a plurality of descriptors for respectively representing a plurality of feature points extracted from any one image. The plurality of recognition descriptors in the recognition image means a plurality of recognition descriptors for respectively representing a plurality of recognition feature points extracted from any one recognition image.

'Image information' is data on any one image, and includes an image of the image itself, a plurality of feature points extracted from the image, and/or a plurality of descriptors in the image. 'Recognition image information' is data for any one recognition image, and includes an image of the recognition image itself, a plurality of recognition feature points extracted from the recognition image, and/or the recognition descriptor in the recognition image.

The 'current time information' means time information of the time when the moving-robot 100 performs determination. The current time information may include current hour unit information and may vary depending on the degree of detail, but may further include minute unit information, and may further include second unit information. The current time information may include current year information and may include current month and day information. The current time information may include time slot information to which the current time belongs among time slots divided by a certain reference.

'Current time in day' means the time capable of identifying the time slot in day to which the current point of time belongs. As an example, year, month, and day are not the current time in day, but i hour, ii hour, and minute, or iii hour, minute, second, and the like may be the current time in day. For example, the current time in day may refer to only current hour. As another example, the current time in day may refer to only current hour and minute. As another example, the current time in day may refer to a more specific time including the current hour, minute, and second.

'Current time in year' means the time capable of identifying the time slot in year to which the current point of time belongs. As an example, year, hour, minute, and second are not the current time in year, but i month, ii month, and day, and the like may be the current time in year. For example, the current time in year may refer to only current month. As another example, the current time in year may refer to a more specific time including the current month, and day.

'Generation-time information' means time information at the time when any one map is generated or sensor data used to generate the map is collected. The generation-time information may include hour unit information at the time of map creation and may vary depending on the degree of detail, but may further include minute unit information and may further include second unit information. The generation-time information may include year information at the time of map creation and may include month and day information at the time of map creation. The generation-time information may include time slot information to which the point of time of map creation belongs among the time slots divided by a certain reference.

'Generation-time in day' means the time capable of identifying the time slot in day to which the point of time of map creation belongs. As an example, year, month, and day are not the generation-time in day, but i hour, ii hour, and minute, or iii hour, minute, second, and the like may be the generation-time in day. As an example, the generation-time in day may refer to only hour at the time of map creation. As another example, the generation-time in day may refer to only hour and minute at the time of map creation. As another example, the generation-time in day may refer to a more specific time including hour, minute, and second at the time of map creation.

'Generation-time in year' means the time capable of identifying the time slot in year to which the point of time of map creation belongs. As an example, year, hour, and minute are not the generation-time in day, but i month, ii month, day, and the like may be the generation-time in year. As an example, the generation-time in year may refer to only month at the time of map creation. As another example, the generation-time in year may refer to a more specific time including month, and day at the time of map creation.

'Timeslot in day' means a time slot divided by a certain reference in day. For example, timeslots in day (e.g., 22 to 4 hour, 4 to 6 hour, 6 to 9 hour, 9 to 11 hour, 11 to 16 hour, 16 to 18 hour, and 18 to 22 hour) may be divided by typical hour, minute, second units. For example, timeslots in day (e.g., dawn, morning, noon, afternoon, late afternoon, evening, and midnight) may be divided by a different reference instead of the typical hour, minute, and second. In addition, the timeslot in day may be divided in various ways.

The timeslots in day divided by the different reference may be adjusted in consideration of the daylight time according to the current time in year described later. For example, when the current time in year belongs to summer, it is adjusted to increase the afternoon time slot, and when the current time in year belongs to winter, the afternoon time slot may be reduced.

'Timeslot in year' means the time slot divided by a certain reference in year. For example, timeslots in year may be divided by typical month and day units. For another example, timeslots in year (e.g., spring, summer, autumn, winter) may be divided by a different reference instead of the typical month and day.

The moving-robot (or autonomous cleaner) 100 according to the present invention means a robot that can move by itself by using wheels or the like, and may be a home helper robot and a robot cleaner. Hereinafter, the robot cleaner 100 of the moving-robot will be described with reference to FIG. 1 to FIG. 5, but the present invention is not limited thereto.

Referring to FIG. 1 to FIG. 5, the moving-robot 100 may include a main body 110. Hereinafter, in defining each portion of the main body 110, a portion facing the ceiling of the driving area may be defined as a top portion (see FIG. 2), a portion facing the floor of the driving area may be defined as a bottom portion, and a main driving direction portion of the portion forming the circumference of the main body 110 between the top portion and the bottom portion may be defined as a front portion (see FIG. 3).

The moving-robot 100 may include a driving unit (or driving motor) 160 for moving the main body 110. The driving unit 160 may include at least one driving wheel 136 for moving the main body 110. The driving unit 160 may include a driving motor. A driving wheel 136 may be provided on the left and right sides of the main body 110 which, hereinafter, are referred to as a left wheel 136(L) and a right wheel 136(R) respectively.

The left wheel 136(L) and the right wheel 136(R) may be driven by a single driving motor, but, if necessary, may be provided with a left wheel driving motor for driving the left wheel 136(L) and a right wheel driving motor for driving the right wheel 136(R) respectively. The driving direction of the main body 110 may be switched to the left or right side by making a difference in rotational speed of the left wheel 136(L) and the right wheel 136(R).

A suction port 110h for sucking air may be formed on the bottom portion of the main body 110. In the main body 110, a suction device (not shown) for supplying suction force for sucking air through the suction port 110h and a dust container (not shown) for collecting dust sucked through the suction port 110h together with the air may be formed.

The main body 110 may include a case 111 forming a space in which various components constituting the moving-robot 100 are accommodated. The case 111 may have an opening for insertion and removal of the dust container, and a dust container cover 112 for opening and closing the opening may be rotatably provided in the case 111.

The main body 110 may be provided with a main brush 134 of a roll type having brushes exposed through the suction port 110h, and an auxiliary brush 135 which is located on the front side of the bottom portion of the main body 110 and has a brush formed of a plurality of radially extending feathering. Due to the rotation of these brushes 134 and 135, dusts may be removed from the floor in the cleaning area, and the dusts separated from the floor may be sucked through the suction port 110h and collected in the dust container.

The battery 138 may supply power not only to the driving motor but also to the entire operation of the moving-robot 100. When the battery 138 is discharged, the moving-robot 100 may drive to return to a charging stand 200 for charging. During the return driving, the moving-robot 100 may automatically detect the location of the charging stand 200.

The charging stand 200 may include a signal transmission unit (not shown) for transmitting a certain return signal. The return signal may be an ultrasound signal or an infrared signal, but is not limited thereto.

The moving-robot 100 may include a signal detection unit (not shown) for receiving the return signal. The charging stand 200 may transmit an infrared signal through the signal transmission unit, and the signal detection unit may include an infrared sensor that detects the infrared signal. The moving-robot 100 may move to the location of the charging stand 200 according to the infrared signal transmitted from the charging stand 200 and dock with the charging stand 200. Due to the docking, a charging may be achieved between a charging terminal 133 of the moving-robot 100 and a charging terminal 210 of the charging stand 200.

The moving-robot 100 may include an environmental information acquisition unit for acquiring environmental information during driving. The environmental information may include various detection information such as image information.

The environmental information acquisition unit may include an image acquisition unit 120 for acquiring an image around the main body 110. The image acquisition unit 120 may photograph a cleaning area and may include a digital camera. The digital camera may include at least one optical lens, an image sensor (e.g., CMOS image sensor) including a plurality of photodiodes (e.g., pixel) forming an image formed by a light passing through the optical lens, and a digital signal processor (DSP) for forming an image based on a signal output from the photodiodes. The digital signal processor can create a moving image including frames composed of still images as well as a still image.

Preferably, the image acquisition unit (or camera) 120 may be provided on the top portion of the main body 110 to acquire an image of a ceiling in the cleaning area, but the location and the photographing range of the image acquisition unit 120 are not limited thereto. For example, the image acquisition unit 120 may be provided to acquire an image in front of the main body 110.

In addition, the environmental information acquisition unit may include an obstacle detection sensor 131 for detecting an obstacle ahead. The environmental information acquisition unit may include a cliff detection sensor 132 for detecting a cliff on the floor in the cleaning area. The environmental information acquisition unit may include a lower camera sensor 139 for acquiring a bottom image.

In addition, the moving-robot 100 may include an operation unit (or input device) 137 that can input an on/off command or various commands.

Figure 5:
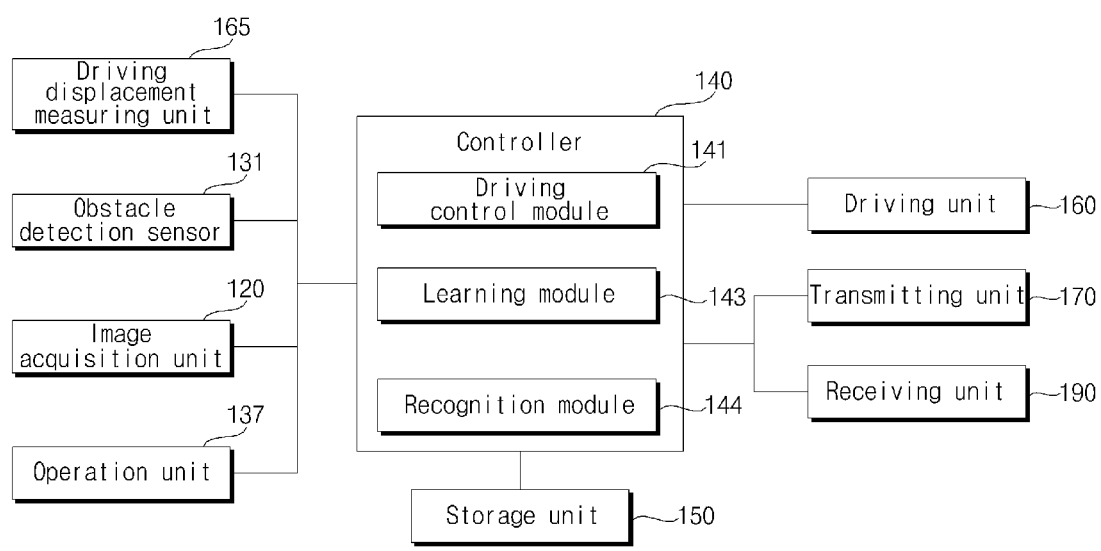
FIG. 5 is a block diagram illustrating a control relationship between main components of the moving-robot of FIG. 1.

Referring to FIG. 5, the moving-robot 100 may include a storage unit (or memory) 150 for storing various data. Various data necessary for controlling the moving-robot 100 may be stored in the storage unit 150. The storage unit 150 may include a volatile or non-volatile recording medium. The storage medium may store data that can be read by a microprocessor, and may include a hard disk drive (HDD), a solid state disk (SSD), a silicon disk drive (SDD), a ROM, a RAM, Magnetic tape, floppy disk, optical data storage, and the like.

The storage unit 150 may store a map of the driving area. The map may be input by an external terminal capable of exchanging information with the moving-robot 100 through wired or wireless communication, or may be created by the moving-robot 100 through self learning. In the former case, the external terminal may be, for example, a remote controller, a PDA, a laptop, a smart phone, a tablet, and the like equipped with an application for setting a map.

The map may display the locations of a plurality of nodes corresponding to (one-to-one correspondence) a plurality of points in the driving area. In addition, the current location of the moving-robot 100 may be displayed on the map. The current location of the moving-robot 100 on the map may be updated in the driving process.

The driving displacement is a concept including the moving direction and the moving distance of the moving-robot. Assuming that the floor surface of the driving area is on a plane in which the X and Y axes are orthogonal, the driving displacement may be expressed as $(\Delta x, \Delta y, \theta)$. $\Delta x$, Δy may represent the displacement in the X-axis and Y-axis directions, and θ may represent the rotation angle.

The environmental information acquisition unit may include a driving displacement measuring unit (or a driving displacement measuring processor) 165. The driving displacement measuring unit 165 may measure the driving displacement based on the image acquired by the lower camera sensor 139. For example, the driving displacement measuring unit 165 may measure the driving displacement through a continuous pixel comparison of the floor image that varies according to the continuous movement of the moving-robot 100.

The driving displacement measuring unit 165 may measure the driving displacement of the moving-robot 100 based on the operation of the driving unit 160. For example, the driving control module 141 may measure the current or past driving speed of the moving-robot 100, the drive distance, and the like based on the rotational speed of the driving wheel 136, and a current or past direction change process may also be measured according to the rotation direction of each of the driving wheels 136(L), 136(R).

The driving displacement measuring unit 165 can measure the driving displacement by using at least one of the obstacle detection sensor 131 and the image acquisition unit 120. The controller 140 may recognize the location of the moving-robot 100 on the map, based on the measured driving displacement.

A transmitting unit (or transmitter) 170 may transmit the information of the moving-robot to other moving-robot or a central server. A receiving unit (or receiver) 190 may receive information from other moving-robot or the central server. The information transmitted by the transmitting unit 170 or the information received by the receiving unit 190 may include configuration information of a node N of the moving-robot described later.

The moving-robot 100 may include a controller 140 for processing and determining various information. The controller 140 may perform information processing for learning a driving area. The controller 140 may perform information processing for recognizing the current location on the map. The controller 140 may control the overall operation of the moving-robot 100 by controlling various components (e.g., the driving displacement measurement unit 165, the obstacle detection sensor 131, the image acquisition unit 120, the operation unit 137, the driving unit 160, the transmitting unit 170, the receiving unit 190, and the like) forming the moving-robot 100. The controller 140 may include a driving control module 141, a learning module 143, and a recognition module 144.

The driving control module 141 may control the driving of the moving-robot 100. The driving control module 141 may control the driving of the driving unit 160 according to a driving setting.

The learning module 143 may create a map of the driving area. For the location recognition in the entire area, the learning module 143 may match the image acquired at each point with each node (N) on the map. One-to-one correspondence may be achieved between the acquired images and the nodes.

The learning module 143 may create a node on the map based on the driving displacement information. For example, node coordinate information may be created, based on the driving displacement measured based on an origin node O described later. The node coordinate information D186 of the created node N may be a relative coordinate value for the origin node O. The node information may include image information D183 corresponding to the node.

The learning module 143 may create a map based on the driving displacement between the node N and the node. The learning module 143 may create a map based on border information. The learning module 143 may update a previously created map. For example, the learning module 143 may update pre-stored node coordinate information D186 based on a loop displacement (LC) described later.

The learning module 143 may create a plurality of maps having different generation-time information. The learning module 143 may create a plurality of map information that achieve one-to-one correspondence to the plurality of maps. Each map information may include each generation-time information. The learning module 143 may create a plurality of maps having different generation-time information based on the environmental information respectively acquired in a plurality of driving processes at different points in time.

The recognition module 144 may recognize the current location by using the detection result of the environmental information acquisition unit. The recognition module 144 may recognize the current location by using at least one of the obstacle detection sensor 131 and the image acquisition unit 120. Hereinafter, a process of recognizing an unknown current location by using the image acquisition unit 120 will be described as an example, but the present invention is not limited thereto.

The recognition module 144 may attempt to recognize an unknown current location in the jumping situation. The recognition module 144 may attempt to recognize the current location on the map. Obviously, even if it is not necessarily a jumping situation, it is possible to attempt to recognize the current location on the map.

The recognition module 144 may attempt to recognize the location on the map by a certain algorithm and determine whether the location recognition is successful. The success of the location recognition may be determined based on a certain degree of similarity. For example, when node information achieving one-to-one correspondence to a plurality of nodes on the map is compared with environmental information acquired from an unknown current location, if there is no node information adjacent to the environmental information of the current location beyond a certain degree of similarity, it may be determined that the location recognition has failed. For example, when the location recognition is successful, the recognition module 144 may choose a node corresponding (univalent correspondence) to the current location among the plurality of nodes on the map.

The recognition module 144 may choose any one of a plurality of maps stored based on the current time information and the generation-time information for the maps, and may recognize the location on the chosen map. The recognition module 144 may select any one of a plurality of maps according to a certain map choosing algorithm.

Hereinafter, a method of controlling the moving-robot according to the embodiments of the present invention will be described with reference to FIGS. 6-16. The control method may be performed only by the controller 140, or may be performed by an external terminal or a server according to an embodiment. The present invention may be a computer program implementing each step of the control method, or a recording medium on which a program for implementing the control method is recorded. The 'recording medium' means a computer-readable recording medium. The present invention may be a system including both hardware and software.

In some embodiments, it is also possible that the functions mentioned in steps occur while being out of sequence. For example, two steps shown consecutively may, in fact, be performed substantially concurrently or, sometimes, the steps may be performed in reverse order according to a corresponding function.

Figure 6:
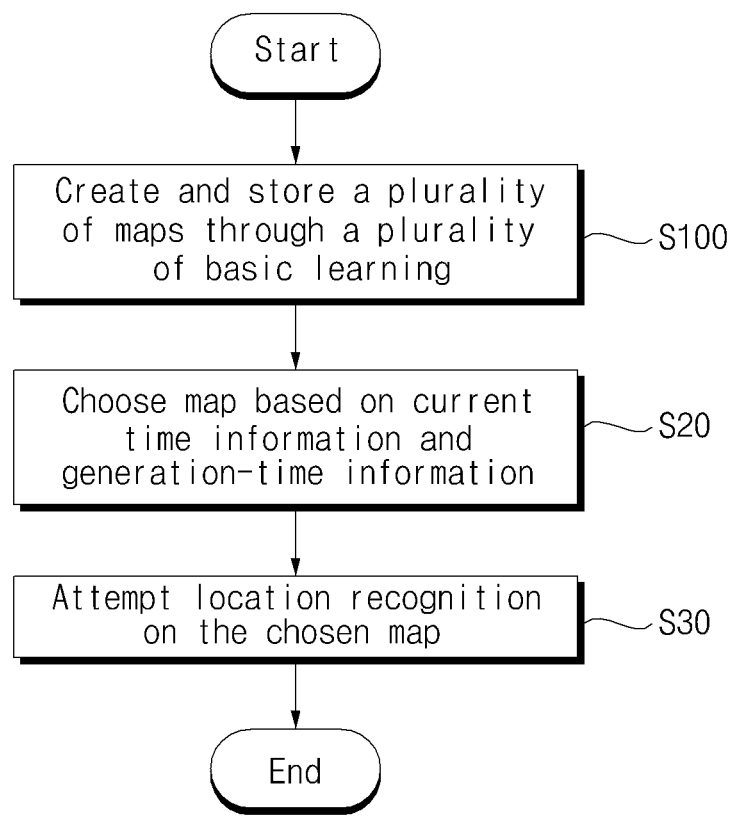
FIG. 6 is a flowchart illustrating a control method according to an embodiment of the moving-robot of FIG. 1.

Referring to FIG. 6, the control method may include a map creation step (S100) of creating a plurality of maps having different generation-time information through a plurality of driving processes. The map creation step S100 may be referred to as step (a). In the map creation step S100, a map may be created based on the environmental information acquired in the driving process. In the map creation step S100, a plurality of maps having different generation-time information may be created based on the environmental information acquired in each of a plurality of driving processes at different points of time.

Referring to FIG. 6, the control method may include a recognition processing step (S20, S30) of choosing any one of the plurality of maps according to a certain map choosing algorithm based on the current time and the generation-time information, and attempting the position recognition on the chosen map. The recognition processing step (S20, S30) may be referred to as step (b). The recognition processing step (S20, S30) may include a map choosing step (S20) of choosing any one of a plurality of maps based on the current time information and the generation-time information. The recognition processing steps (S20, S30) may include a location recognition step S30 of attempting the location recognition on the map chosen in the map choosing step S20.

Figure 7:
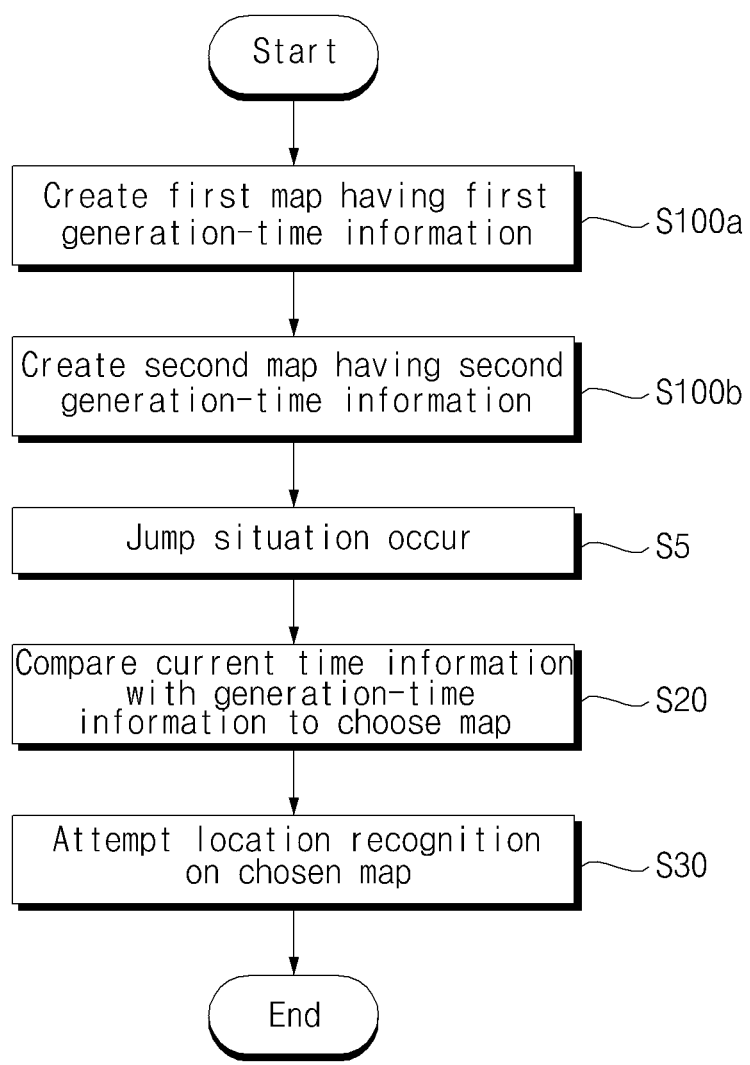
FIG. 7 is a flowchart illustrating a scenario of the control method of the moving-robot of FIG. 1.

Referring to FIG. 7, a scenario of the map creation step (S100) and the recognition processing step (S20, S30) is illustrated. A first map creation step (S100a) of creating a first map having first generation-time information may be performed. For example, a first map may be created through driving (basic learning) at first generation-time in day and first generation-time in year (S100a).

Thereafter, a second map creation step (S100b) of creating a second map having second generation-time information is performed. For example, a second map may be created through driving (basic learning) at second generation-time in day and second generation-time in year (S100b). Here, the first generation-time information and the second generation-time information are different from each other. Specifically, the first generation-time in day and the second generation-time in day may be different from each other, or the first generation-time in year and the second generation-time in year may be different from each other. Obviously, it is also possible that the first generation-time in day and the second generation-time in day may be different from each other, and at the same time, the first generation-time in year and the second generation-time in year may be different from each other. For example, the first map may be created through a driving (basic learning) in a day timeslot where illuminance due to sunlight is high, and the second map may be created through a driving (basic learning) in an evening timeslot where the indoor light is likely to be turned on.

In the scenario of FIG. 7, after a plurality of maps including the first map and the second map are created (S100a, S100b), a jumping (or jump) situation may occur (S5). Thus, the recognition processing steps (S20, S30) may be started. Specifically, when the jumping situation occurs (S5), the current time information may be compared with the generation-time information of each of the plurality of maps, and one of the plurality of maps may be chosen (S20). For example, when the current time in day is 1:00 pm, the first generation-time in day is 2:00 pm, the second generation-time in day is 8:00 pm, and there is no pre-stored map excluding the first map and the second map, the first map may be created at the first generation-time in day having the smallest time difference from the current time in day. Here, the first generation-time information reflecting the first generation-time in day may be compared with the current time information reflecting the current time in day, so that the time difference between the current time in day and the first generation-time in day can be recognized. Thereafter, the location recognition of the moving-robot 100 may be attempted on the chosen map (S30). For example, a node corresponding to the current location on the first map may be chosen by comparing the information of a plurality of nodes on the first map chosen from a plurality of maps with a recognition image photographed at the current location.

Figure 8:
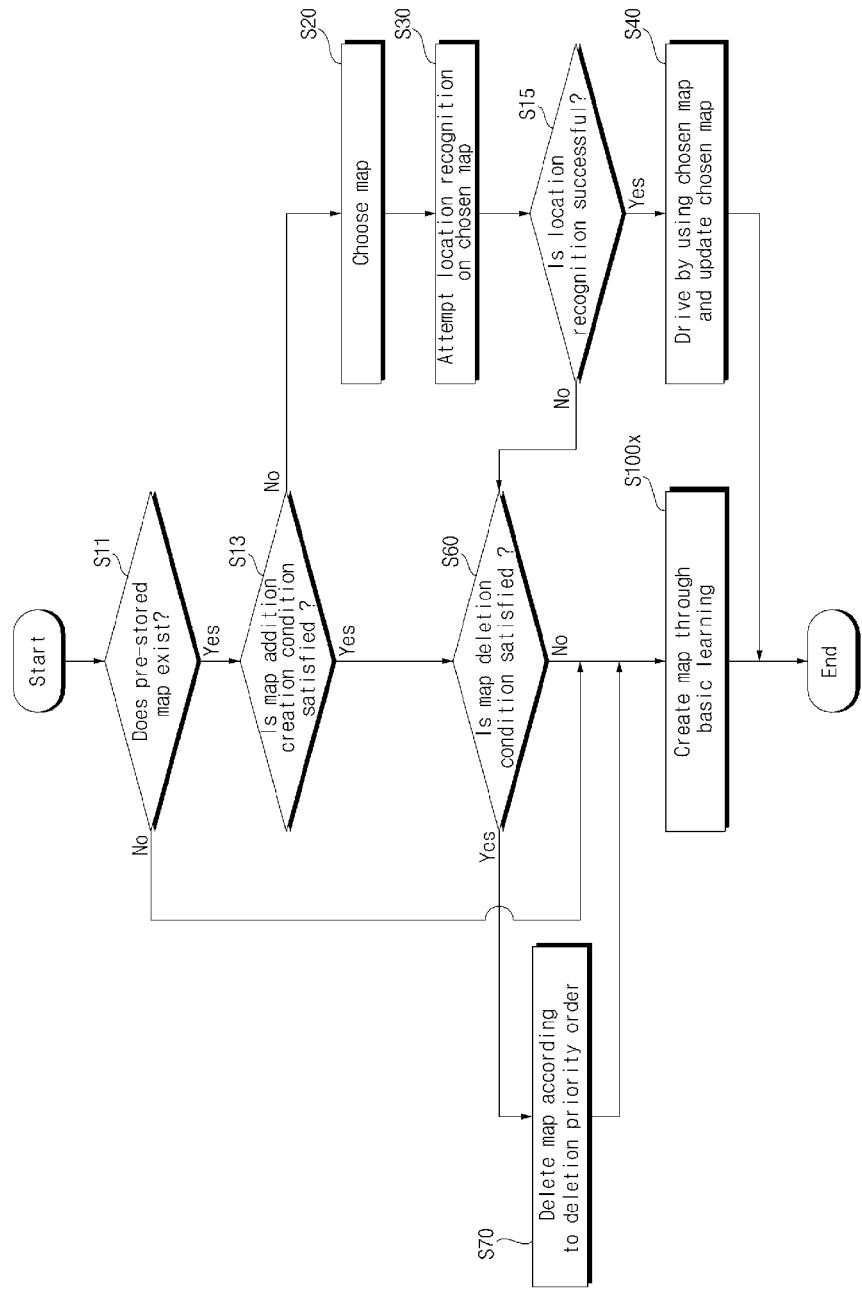
FIG. 8 is a flowchart illustrating an embodiment of an algorithm for determining a creation (S100x) of any one map in a step S100 of creating a plurality of maps in the flowcharts of FIGS. 6 and 7.

Referring to FIG. 8, an algorithm according to an embodiment for determining whether to create a map by the moving-robot 100 will be described. This algorithm may be performed when the moving-robot 100 is in the docking state with the charging stand 200 and then starts driving. In addition, the algorithm may be performed when a jumping situation occurs.

In the present embodiment, it is described that the controller 140 of the moving-robot 100 performs the determination process in the following algorithm. However, it is also possible that at least a part of the determination process is performed by a terminal or a server and the operation of the moving-robot 100 is controlled by transmitting a signal of the determination result to the moving-robot 100.

Referring to FIG. 8, a process S11 of determining whether a pre-stored map exists may be performed. The determining of the pre-stored map may be a process of determining whether a map is stored in the storage unit 150 of the moving-robot 100. As a result of the process S11, when it is determined that the pre-stored map does not exist, a process S100x in which the moving-robot 100 creates one map through basic learning may be performed. Here, the basic learning may include a process in which the moving-robot 100 drives in a driving area and acquires environmental information for creating a map.

When it is determined in the process S11 that the pre-stored map exists, a process S13 of determining whether a certain map addition creation condition is satisfied may be performed. When it is determined in the process S13 that the map addition creation condition is satisfied, a process S60 of determining whether a certain map deletion condition is satisfied may be performed. Although it is shown in FIG. 8 that the process S60 is performed after the process S13, the process S60 may be performed before the process S13. In addition, it is also possible that the process S60 may be performed during the process S13. Details of the map addition creation condition and the map deletion condition will be described later.

When it is determined in process S60 that the map deletion condition is satisfied, a process S70 of deleting the map according to a certain deletion priority order may be performed. In the process S70, only a single map may be deleted from among a plurality of maps. In the process S70, a minimum map for securing a certain capacity in the storage unit 150 may be deleted. For example, when two maps among a plurality of maps should be deleted, a first priority map and a second priority map according to the deletion priority order may be deleted. Details of the deletion priority order will be described later.

When it is determined in the process S13 that the map addition creation condition is satisfied, a process S100x in which the moving-robot 100 creates one map through basic learning may be performed. When it is determined in the process S60 that the map deletion condition is satisfied, the map creation step S100x may be performed after at least one map is deleted. When it is determined in the process S60 that the map deletion condition is not satisfied, the map creation step S100x may be performed without deleting the map.

When it is determined in the process S13 that the map addition creation condition is not satisfied, the map choosing step S20 may be performed to select any one of the previously stored map(s). Thereafter, the location recognition step S30 in which the location recognition on the map chosen in the step S20 is attempted may be performed. When the location recognition is attempted in the location recognition step S30 and the location recognition is successful (S15), a process (S40) in which the moving-robot 100 drives by using the chosen map and updates the chosen map based on acquired environmental information may be performed.

In the present embodiment, when the location recognition is attempted in the location recognition step (S30) and the location recognition has failed (S15), a process S60 of determining whether the map deletion condition is satisfied may be performed. When it is determined that the map deletion condition is satisfied, at least one map may be deleted and the map creation step (S100x) may be performed. When it is determined that the map deletion condition is not satisfied, the map creation step (S100x) may be performed without deleting the map.

As another example, when the location recognition is attempted in the location recognition step S30 and the location recognition has failed (S15), it may be considered that the map deletion condition is satisfied and the map that failed to recognize the location may be deleted. After the map having failed to recognize the location is deleted, the map creation step (S100x) may be performed.

Figure 9:
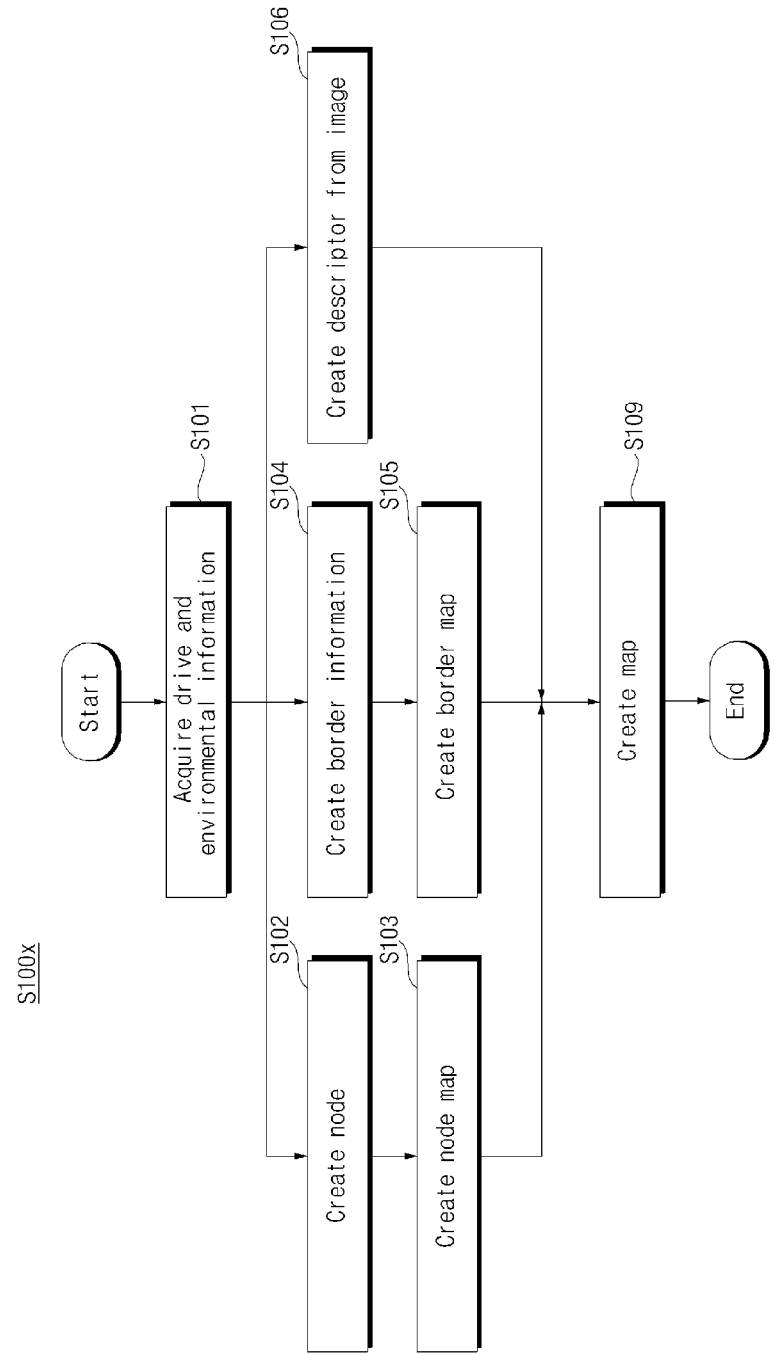
FIG. 9 is a flowchart illustrating a specific process according to an embodiment of a map creation step S100x in the flowchart of FIG. 8.

Referring to FIG. 9, the map creation step (S100x) is described in more detail. The map creation step S100x may be a step of creating any one map. The map creation step S100x may be any one of an initial map creation step of creating a map in a state in which there is no pre-stored map, and an additional map creation step of creating a map in a state in which a pre-stored map exists.

The step (S100) of creating a plurality of maps may include the initial map creation step (S100x) and the additional map creation step (S100x). The step (S100) of creating a plurality of maps may include the initial map creation step (S100x) of creating a map through a driving process when it is determined that there is no pre-stored map. The step (S100) of creating a plurality of maps may include the additional map creation step (S100x) of creating a map through a driving process when it is determined that a certain map addition creation condition is satisfied when it is determined that a pre-stored map exists. For example, when it is determined that the location recognition has failed in the location recognition step S30, the additional map creation step S100x of creating a map through the driving process may be performed.

The map creation step S100x may include a process of driving in the driving area. The map creation step S100x may include a step S101 of acquiring environmental information during driving. The moving-robot may acquire the environmental information by using the obstacle detection sensor 131, the cliff detection sensor 132, the lower camera sensor 139, the image acquisition unit 120, and other known means. In the map creation step (S100x), environmental information may be acquired, and the map may be created based on the acquired environmental information.

The environmental information may be information that varies according to the illuminance outside the moving-robot 100. Two environmental information acquired in a state in which all other conditions are the same at a different generation-time in day may be different from each other. The state in which all other conditions are the same means that the moving-robot 100 detects environmental information in the same point in the same direction by the same kind of environmental information acquisition unit. Accordingly, in the map created at the generation-time in day close to the current time in day, when the location recognition is attempted based on the environmental information, the success rate and the accuracy of the location recognition may be enhanced.

In the present embodiment, it is described that the environmental information includes an image influenced by illumination so that the above effect according to the present control method is generated. However, furthermore, in the case of environmental information other than the image influenced by the illuminance, it is obvious that the above effect may be generated. In addition, in the case of the environmental information formed by the combination of the detection information influenced by the illuminance and the detection information not influenced by the illuminance, it is obvious that the above effect can also be achieved according to the present control method.

The environmental information may include an image outside the moving-robot 100. The image may be a photograph of a part of the driving area. The image may be a photograph of a ceiling. In the above step S101, the moving-robot 100 may drive and acquire an image for each of the separated points. Each point may correspond to each acquisition image. A plurality of points may achieve one-to-one correspondence to a plurality of acquisition images.

The image may be particularly strongly influenced by illumination. Two images photographed at the same point by the moving-robot 100 at different generation-time in day may be different from each other. Accordingly, in the map created at the generation-time in day close to the current time in day, by comparing the recognition image with the image corresponding to the node, the success rate and the accuracy of the location recognition can be more enhanced.

Environmental information may include the distance to a driving obstacle factor. For example, the moving-robot 100 may acquire a distance value to a wall from any one point. The environmental information may also include other information that the moving-robot 100 may detect in the driving area.

The map creation step S100x may include a step S102 of creating a node based on the acquired environmental information. The map creation step S100x may include a step S102 of creating a node based on the measured driving displacement. Each node may correspond to the coordinate information of each point. Each node may correspond to each image acquired at each point. Each node may correspond to each image information. A plurality of nodes may achieve one-to-one correspondence to a plurality of acquisition images. The process S102 may be performed during a process of moving to a next point after acquiring an image at a certain point. The process S102 may be performed while performing the process S101.

In the map creation step S100x, a plurality of nodes on the map corresponding to a plurality of points of the driving area may be created. In the map creation step S100x, environmental information may be acquired for each point during driving, and each node on the map corresponding to each point may be created. In the map creation step S100x, an image may be acquired for each point during driving, and each node on the map corresponding to each point may be created.

The plurality of nodes of any one map may have coordinate information of each point. Each coordinate information of the plurality of nodes in any one map may be represented by a single coordinate system. The plurality of nodes may have respective image information acquired at each point.

The map creation step S100x may include a process S103 of creating a node map composed of a plurality of nodes created through the process S102. The node map may include the plurality of nodes. The node map may include a plurality of node information.

The map creation step S100x may include a process S104 of creating border information based on the acquired environmental information. The map creation step S100x may include a process S104 of creating border information based on the measured distance to the driving obstacle factor. For example, when the moving-robot 100 detects that there is a driving obstacle factor in a location spaced apart by a distance value d1 forward from a point P1 on the driving area, the border information having coordinate information in a location spaced apart by a distance value d1 forward may be created based on any one node N1 corresponding to the point P1 on the map. The process S104 may be performed during a process of moving to the next point after acquiring environmental information in any one point. The process S104 may be performed while performing the process S101.

The map creation step S100x may include a process S105 of creating a border map including a plurality of border information created in the process S104. The border map may include a plurality of border information. The border map may correspond to the entire shape of the driving area. In the map creation step S100x, a driving obstacle factor may be detected and a border map including border information corresponding to the driving obstacle factor may be created.

The map creation step S100x may include a process S106 of creating a plurality of descriptors from the acquired image. Specifically, in the process S106, a plurality of feature points may be extracted from the acquired image. In the process S106, each descriptor corresponding to the extracted plurality of feature points may be created. A plurality of feature points may achieve one-to-one correspondence to a plurality of descriptors. The process S106 may be performed during a process of moving to a next point after acquiring an image in any one point. The process S106 may be performed while performing the process S101.

When a node map is created in the process S103 and a border map is created in the process S105, a single map including the node map and the border map may be created (S109).

Figure 15:
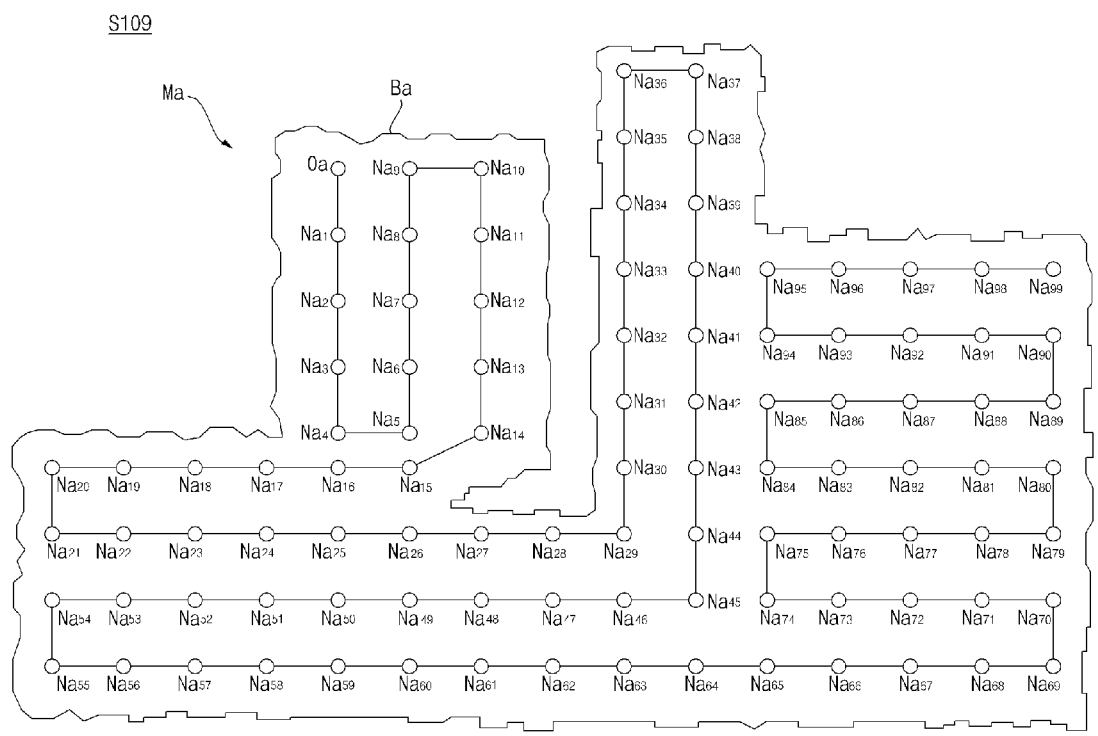
FIG. 15 is a conceptual diagram illustrating an example of a first map Ma created according to the control method of FIG. 9, in which the first map includes a node map created according to the flowcharts of FIGS. 11 to 13.
Figure 15:
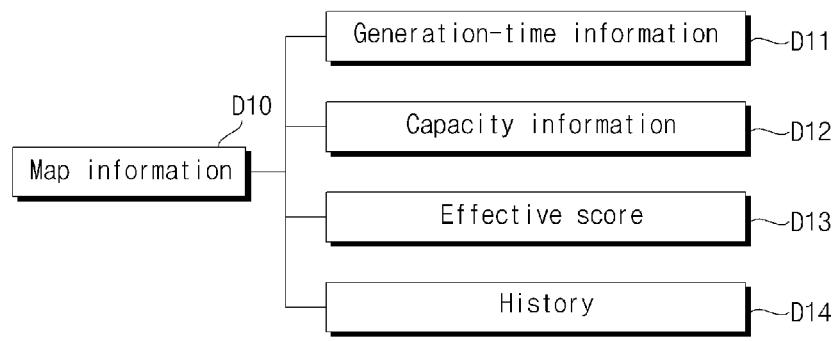

Referring to FIG. 15, any one map Ma may include a node map Na1, Na2, . . . , Na99 and a border map Ba. The node map refers to information formed of a plurality of nodes among various information on a single map, and the border map refers to information formed of a plurality of border information among various information on a single map. The node map and the border map may be an element of the map, and the process of creating the node map (S102, S103) and the process of creating the border map (S104, S105) may be performed simultaneously. For example, the border information may be created based on the coordinate information (D186) of the pre-stored node corresponding to a specific point, after measuring the distance of the driving obstacle factor away from the specific point. For example, the node coordinate information D186 of the node may be created based on the pre-stored border information corresponding to a specific obstacle, after measuring the distance of the specific point away from the specific obstacle. As for the node and border information, the other may be created on the map, based on the relative coordinate of the other with respect to one stored previously.

In addition, the map may include the image information created in the process S106. A plurality of nodes may achieve one-to-one correspondence to a plurality of image information. The specific node may correspond to a specific image information.

Further, referring to FIG. 15, the map Ma may include certain map information D10. The map information D10 may be information related with the created map, and may be data(s) corresponding to a single map.

The map information D10 may include the generation-time information D11 corresponding to the map Ma. The generation-time information D11 may be created based on any one point of time according to a certain reference between the starting point and the end point of the map creation step S100x. For example, the generation-time information D11 may be created by assuming that the starting point of the map creation step S100x is the generation-time in day, or may be created by assuming that a certain midpoint of the map creation step S100x is the generation-time in day. More preferably, the generation-time information D11 may be created, based on any one point of time based on a certain reference between the start point and the end point of the process S101 of acquiring image information for creating a corresponding map.

The map information D10 may include capacity information D12 (e.g., 30 MB) on the storage unit 150 occupied by the map Ma. For example, as the capacity information D12 becomes larger, the weight may be set so as to have prior order in the deletion priority order.

The map information D10 may include an effective score D13 according to the size or scarcity of feature point in the images in the map Ma. For example, as the size of the feature point becomes larger or as the scarcity of the feature point becomes greater, the effective score D13 of the map may become larger. For example, as the effective score D13 becomes larger, the weight may be preset so as to have a lower priority in the deletion priority order.

The map information D10 may include a history D14 of the map Ma. The history D14 may include a number of times by which the map Ma is chosen, a point of time at which the map is chosen, and the like. The history D14 may include the success rate of location recognition when the map Ma is chosen. For example, as the success rate of the location recognition of the map Ma becomes higher, the weight value may be set so as to have a lower priority in the deletion priority order.

Meanwhile, when it is assumed that a plurality of maps include a first map and a second map, a first driving area for driving to create the first map and a second driving area for driving to create the second map may be the same or may not be the same. The moving-robot 100 may perform the first map creation step S100x and the second map creation step S100x without knowing whether the first driving area and the second driving area are the same. For example, when the moving-robot 100 drives only in the first driving area, the map created by performing the basic learning in the second driving area may fail to recognize the location, and the map deletion condition may be satisfied, so that the probability of deleting a map created by performing basic learning in the second driving area may be increased.

Meanwhile, when a plurality of maps are stored, the plurality of maps may be classified according to a certain classification reference. As an example, a plurality of maps may be classified, depending on a timeslot in day to which the generation-time in day of each of a plurality of maps belongs. The maps belonging to the timeslot in day having the same generation-time in day may be classified as the same group.

As another example, a plurality of maps may be classified, depending on a timeslot in year to which the generation-time in year of each of a plurality of maps belongs. The maps belonging to the timeslot in year having the same generation-time in year may be classified as the same group. As another example, a plurality of maps may be classified according to the level of each location recognition success rate. For example, the maps whose location recognition success rate is greater than or equal to a certain value may be classified as the same group.

Figure 10:
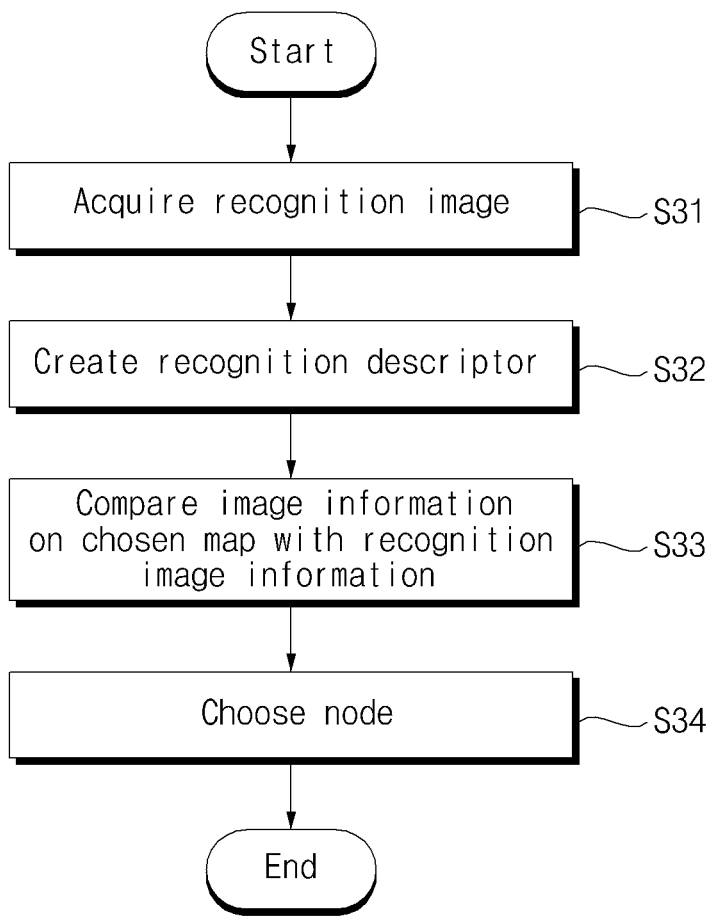
FIG. 10 is a flowchart illustrating a specific process according to an embodiment of recognition processing steps (S20, S30) of in the flowcharts of FIGS. 6-8.

Referring to FIG. 10, the location recognition step S30 may include a recognition image acquisition step S31. The location recognition step S30 may include a step S32 of creating a recognition descriptor based on the recognition image. The location recognition step S30 may include a step S33 of comparing the image information on the map chosen in the map choosing step S20 with the recognition image information. The location recognition step S30 may include a step S34 of choosing a node estimated as a current location among a plurality of nodes on the chosen map.

In the recognition image acquisition step S31, the moving-robot 100 may acquire a recognition image at an unknown current location. The process S31 may be performed immediately after starting the driving in a docked state, or may be performed when a jumping situation occurs.

In the recognition descriptor creation step S32, each recognition descriptor corresponding to a plurality of recognition feature points extracted from the acquired recognition image may be created. A plurality of recognition feature points may achieve one-to-one correspondence to a plurality of recognition descriptors. The process S32 may be performed after acquiring at least one recognition image at the current location.

For example, in the comparing process S33, the node information may be compared with the recognition image information acquired at the current location for each comparison target node. As a method of comparing the image information for each node with the recognition image information, any one of various known methods may be used.

As another example, in the comparing process S33, the recognition image information may be compared with the image information on the map. The method of comparing a plurality of descriptors created based on a plurality of images with a plurality of recognition descriptors created based on a recognition image may be any one of various known methods.

When all the similarities calculated for each comparison target node in the node choosing process S34 do not exceed a certain value, it can be determined that the location recognition has failed on the chosen map. In the node choosing process S34, when at least one of the similarities calculated for each comparison target node exceeds a certain value, the node having the largest similarity degree may be chosen. In the node choosing process S34, a node estimated as the current location among a plurality of nodes on the map may be chosen. The moving-robot 100 may recognize the node chosen in the process S34 as the current location, and, based on this, may continue the driving.

Hereinafter, a specific example of the map creation step S100x will be described with reference to FIGS. 11 to 15. The driving area may include a floor 1 and a ceiling 2. The driving area may include a wall 3 and other vertical element that restricts the driving of the moving-robot 100.

Figure 11:
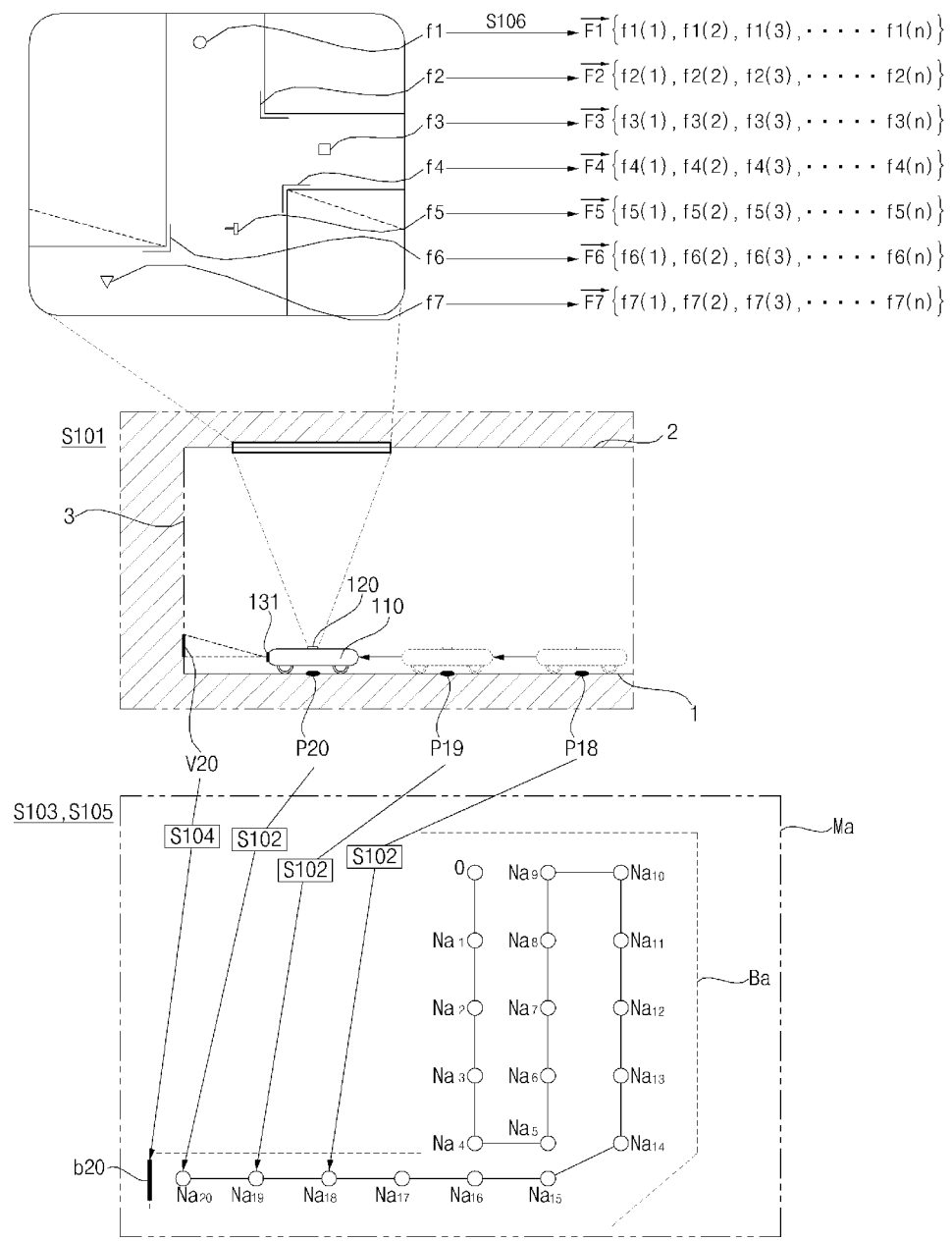
FIG. 11 is a conceptual diagram illustrating a driving and environmental information acquiring process (S101), a node creation process (S102), a node map creation process (S103), a border creation process (S104), a border map creation process (S105), and a descriptor creation process (S106) in the flowchart of FIG. 9.

Referring to FIG. 11, in the environmental information acquiring process S101, the image acquisition unit 120 may acquire the image of each point (e.g., P18, P19, P20) while the moving-robot 100 drives along the floor 1. The image may be photographed toward the upper side of the moving-robot 100. The image may be obtained by photographing the ceiling 2. The image shown in FIG. 11 may be an image corresponding to the point P20. In the environmental information acquiring process (S101), the obstacle detection sensor 131 may detect a driving obstacle factor while the moving-robot 100 is driving. The obstacle detection sensor 131 may be any one of an infrared(IR) sensor, an ultrasonic sensor, and an image sensor. It is also possible that the driving obstacle factor is detected by the cliff detection sensor 132, the lower camera sensor 139, the image acquisition unit 120, and other known means. The moving-robot 100 may detect a driving obstacle factor at each point (P18, P19, P20). The moving-robot may detect the outer surface of the wall 3 which is one of the driving obstacle factors at the point P20.

Referring to FIG. 11, in the node creation process S102, the moving-robot 100 may create a node Na20 corresponding to the point P20. In the node creation process S102, the moving-robot 100 may create each node (Na18, Na19, Na20) corresponding to each point (P18, P19, P20) respectively. A plurality of nodes (Na18, Na19, Na20) may achieve one-to-one correspondence to a plurality of points (P18, P19, P20). The coordinate information D186 corresponding to the node Na20 may be created based on the driving displacement measured by the moving-robot 100. The image shown in FIG. 11 may be an image corresponding to the created node Na20.

Referring to FIG. 11, in the border information creation process S104, the moving-robot 100 may create border information b20 corresponding to a driving obstacle factor V20. In the border information creation process S104, the moving-robot 100 may create each border information corresponding to each driving obstacle factor. A plurality of driving obstacle factors may achieve one-to-one correspondence to a plurality of border information. The border information b20 may be created based on the coordinate information D186 of the node Na20 and the distance value measured by the obstacle detection sensor 131.

Referring to FIG. 11, the node map creation process S103 and the border map creation process S105 may be performed simultaneously. In the node map creation process S103, a node map including a plurality of nodes (Na18, Na19, Na20, etc.) may be created. In the border map creation process S105, a border map Ba including a plurality of border information (b20, etc.) may be created. The map Ma including the node map and the border map Ba may be created in the node map creation process S103 and the border map creation process S105. FIG. 11 shows a map Ma being created through the node map creation process S103 and the border map creation process S105.

In the image shown in FIG. 11, various feature points by the illuminations located in the ceiling, the edge, the corner, the blob, the ridge, and the like may be identified. The moving-robot 100 may extract feature points from an image. Various feature detection methods for extracting feature points from an image are well known in the field of computer vision. Various feature detectors suitable for extracting these feature points are known. For example, it may include Canny, Sobel, Harris&Stephens/Plessey, SUSAN, Shi&Tomasi, Level curve curvature, FAST, Laplacian of Gaussian, Difference of Gaussians, Determinant of Hessian, MSER, PCBR and Gray-level blobs detector, and the like.

Referring to FIG. 11, in the descriptor creation process S106, the descriptor ($\vec{F1}, \vec{F2}, \vec{F3}, \ldots, \vec{F7}$) may be created based on a plurality of feature points (f1, f2, f3, . . . , f7) extracted from the acquired image. In the descriptor creation process S106, a descriptor ($\vec{F1}, \vec{F2}, \vec{F3}, \ldots, \vec{Fm}$) may be created based on a plurality of feature points (f1, f2, f3, . . . , fm) extracted from the acquired plurality of images (where m is a natural number). A plurality of feature points (f1, f2, f3, . . . , fm) may achieve one-to-one correspondence to a plurality of descriptors($\vec{F1}, \vec{F2}, \vec{F3}, \ldots, \vec{Fm}$).

$\vec{F1}, \vec{F2}, \vec{F3}, \ldots, \vec{Fm}$ means an n-dimensional vector. f1(1), f1(2), f1(3), . . . , f1(n) in a brace { } of $\vec{F1}$ means the numerical value of each dimension forming $\vec{F1}$. Since the notation for the rest $\vec{F2}, \vec{F3}, \ldots, \vec{F7}$ has the same method, a description thereof is omitted. A plurality of descriptors($\vec{F1}, \vec{F2}, \vec{F3}, \ldots, \vec{Fm}$) corresponding to a plurality of feature points (f1, f2, f3, . . . , fm) may be created, by using a Scale Invariant Feature Transform (SIFT) technology for feature detection.

For example, after choosing the feature points (f1, f2, f3, f4, f5, f6, f7), which are easy to identify in the image, by applying the SIFT technology, it is possible to create a descriptor that is a n-dimensional vector based on the distribution characteristics(the direction of brightness change and the abrupt degree of change) of brightness gradient of pixels belonging to a certain area around each feature point (f1, f2, f3, f4, f5, f6, f7). Here, the direction of each brightness change of the feature point may be regarded as each dimension, and it is possible to create an n-dimensional vector (descriptor) in which the abrupt degree of change in the direction of each brightness change is a numerical value for each dimension. The SIFT technology may detect unchanging features with respect to scale, rotation, and brightness change of a photograph target. Thus, even if the same area is photographed with a different posture of the moving-robot 100, unchanging (i.e., rotation-invariant) features may be detected. Obviously, the present invention is not limited thereto, and various other technologies (e.g., Histogram of Oriented Gradient (HOG), Haar feature, Fems, Local Binary Pattern (LBP), Modified Census Transform (MCT) may be applied.

Figure 12:
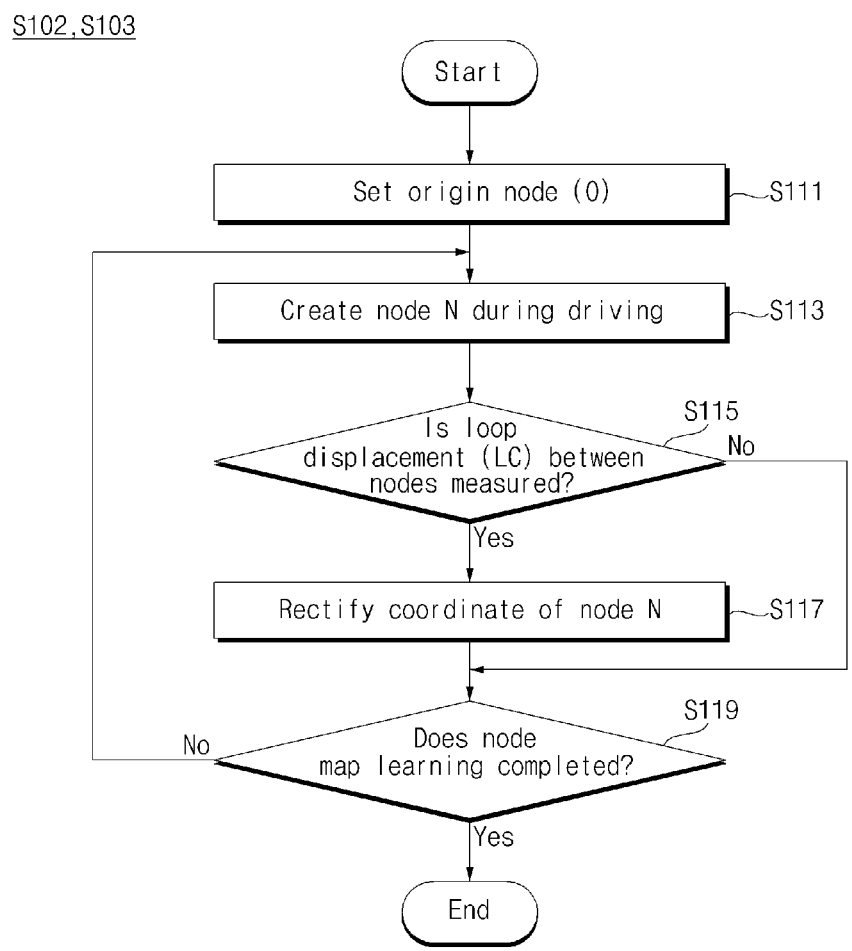
FIG. 12 is a flowchart illustrating an embodiment of the node creation process (S102) and the node map creation process (S103) in the flowchart of FIG. 11.
Figure 13:
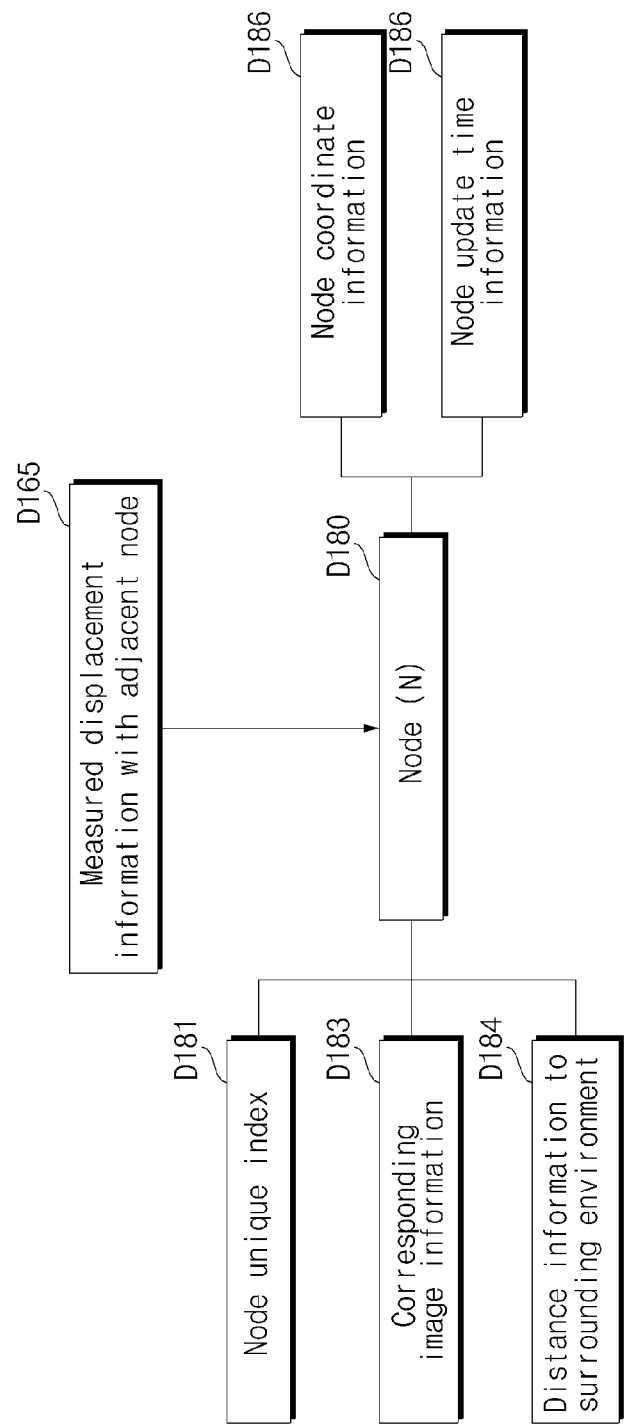
FIG. 13 is a block diagram illustrating configuration information of node N created according to FIG. 12 and information influencing the information of node N.

Referring to FIGS. 12 to 13, the node creation process S102 and the node map creation process S103 will be described in more detail as follows. The node map of the moving-robot 100 may be created based on the node information D180. The node information D180 may be stored in the moving-robot 100 as data.

Referring to FIG. 12, the learning process may include a step S111 of setting an origin node (O). The origin node (O) may be a reference point on the node map. The node coordinate information D186 may be created by adding the driving displacement to the origin node O. Even if the node coordinate information D186 is updated, the origin node O may not be changed.

The learning process may include a process S113 of creating a node N during driving of the moving-robot 100 after the process S111 of setting the origin node O. In the process S113, the moving-robot 100 may create the node information D180.

The learning process may include a process S115 of determining whether a loop displacement (LC) between the nodes N is measured. When the loop displacement LC is measured in the determining process S115, the process S117 of updating the coordinate information D186 of the node N may be performed. When the loop displacement LC is not measured, a process S119 of determining whether the mobile robot 100 has completed the node map learning may be performed. When it is determined in the node map learning completion determining process S119 that the node map learning is not completed, the process S113 of creating the node information during driving may be performed again. The flowchart of FIG. 12 shows an embodiment, and the order of the node information creation process during driving S113 and the process S115 of determining whether a loop displacement (LC) between the nodes may be switched to each other or may be simultaneously performed.

Referring to FIG. 13, the node information D180 may include a node unique index D181 that enables to identify a node which corresponds to node information D180 of a plurality of node information D180. The node information D180 may include image information D183 corresponding to a pertinent node N. The corresponding image information D183 may be an image acquired through the image acquisition unit 120 at a point in the driving area corresponding to the node N.

In addition, the node information D180 may include distance information D184 to the surrounding environment from the node N. The distance information D184 to the surrounding environment may be distance data measured by the obstacle detection sensor 131 or the like at a point corresponding to the node N. The distance information D184 to the surrounding environment may include a distance value with respect to the driving obstacle factor.

In addition, the node information D180 may include node coordinate information D186. The node (N) coordinate information D186 may be created based on the origin node O and the driving displacement. The node (N) coordinate information D186 may be created based on the border information and the distance value to the driving obstacle factor.

In addition, the node information D180 may include node update time information D188. The node update time information D188 is data on the time point at which the node information D180 is created or updated. For example, when the moving-robot 100 receives the node information D180 having the same node unique index D181 as the existing node information D180 from the outside, it may be determined whether the update of the node information D180 is proceeding based on the node update time information D188. The node update time information D188 enables to determine whether the update into the latest node information D180 is proceeding.

The node update time information D188 may be created based on the time when the node information D180 is created. At this time, the node unique index D181 of the created node N2 may be created. In addition, the image information D183 corresponding to the created node N2 may be matched to a corresponding node N2. In addition, the distance information D184 to the surrounding environment of the created node N2 may be matched to the corresponding node N2.

Meanwhile, the node information D180 may be updated based on the measured displacement information D165 with the adjacent node. The measured displacement information D165 with the adjacent node may include data on the driving displacement. The measured displacement information D165 with the adjacent node may include data on a loop displacement LC described later. When the measured displacement information D165 with respect to the adjacent node is input to the controller 140, the pre-stored node information D180 may be created or updated. The update of the node information D180 may be the update of the node coordinate information and the node update time information D188.

Figure 14:
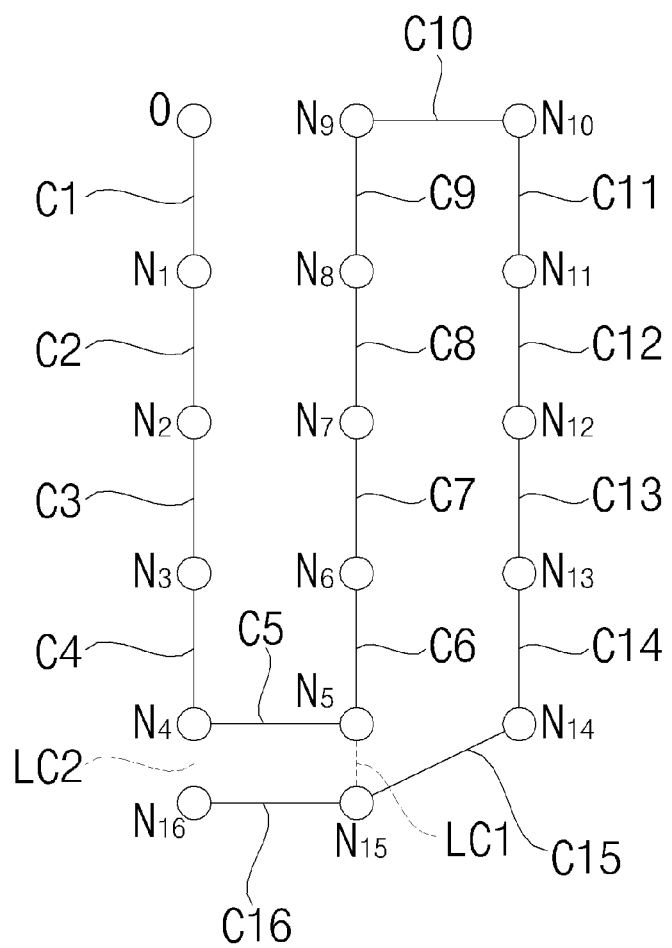
FIG. 14 is a conceptual diagram illustrating a plurality of nodes N and a displacement C between nodes created by the moving-robot while moving according to FIG. 12.

Referring to FIG. 14, the driving displacement C1 may be measured while the origin node O is set, and information D180 of the node N1 is created. The driving displacement C2 may be added to the coordinate information D186 of the node N1 which is the starting point of the measured driving displacement C2, so that the coordinate information D186 of the node N2 which is the end point of the driving displacement C2 can be created. The driving displacement C3 may be measured while the information D180 of the node N2 is created, and the information D180 of the node N3 is created. Information D180 of the nodes (N1, N2, N3, . . . , N16) may be sequentially created based on the sequentially measured driving displacements (C1, C2, C3, . . . , C16).

When defining the node C15 which is the starting point of any one driving displacement C15 as 'base node' of the node 16 which is the end point of a corresponding driving displacement C15, the loop displacement (Loop Constraint: LC) means a measured value of a displacement between any one node N15 and other adjacent node N5 which is not the 'base node N14' of the node N15.

As an example, the acquisition image information D183 corresponding to any one node N15 and the acquisition image information D183 corresponding to other adjacent node N5 may be compared with each other so that the loop displacement (LC) between two nodes N15 and N5 can be measured. As another example, the distance information D184 between the neighboring node N15 and the neighboring environment of the adjacent node N5 may be compared with each other so that the loop displacement (LC) between two nodes N15 and N5 can be measured. FIG. 19 illustrates a loop displacement LC1 measured between node N5 and node N15, and a loop displacement LC2 measured between node N4 and node N16.

The information D180 of any one node N5 created based on the driving displacement may include the node coordinate information D186 and the image information D183 corresponding to the node N5. When there is other node N15 adjacent to the node N5, the image information D183 corresponding to the node N15 may be compared with the image information D183 corresponding to the node N5 to measure the loop displacement LC1 between the two nodes N5 and N15. When the 'loop displacement LC1' and the 'displacement calculated according to the coordinate information D186 of previously stored two nodes N5 and N15' are different from each other, it is possible to update the coordinate information D186 of the two nodes N5 and N15 by considering that there is an error in the node coordinate information D186. In this case, the coordinate information D186 of the other nodes (N6, N7, N8, N9, N10, N11, N12, N13, N14) connected to the two nodes N5 and N15 may also be updated. In addition, the node coordinate information D186, which is updated once, may be continuously updated through the above process.

This will be described in more detail as follows. The two nodes (N) which measured the loop displacement (LC) may be defined as a first loop node and a second loop node, respectively.

A difference($\Delta x1-\Delta x2$, $\Delta y1-\Delta y2$, $\theta 1-\theta 2$) between the 'calculated displacement($\Delta x1$, $\Delta y1$, $\theta 1$)'(calculated by a difference of coordinate values) calculated by the previously stored node coordinate information D186 of the first loop node and the node coordinate information D186 of the second loop node and the loop displacement LC($\Delta x2$, $\Delta y2$, $\theta 2$) may occur. When the difference occurs, the node coordinate information D186 may be updated by considering the difference as an error. The node coordinate information D186 may be updated on the assumption that the loop displacement LC is more accurate than the calculated displacement.

In the case of updating the node coordinate information D186, only the node coordinate information D186 of the first loop node and the second loop node may be updated. However, since the error is created by accumulating the errors of the driving displacements, it is possible to disperse the error and set the node coordinate information D186 of other nodes to be updated. For example, the node coordinate information D186 may be updated by distributing the error values to all the nodes created by the driving displacement between the first loop node and the second loop node. Referring to FIG. 14, when the loop displacement LC1 is measured and the error is calculated, the error may be dispersed to the nodes (N6 to N14) between the first loop node N15 and the second loop node N5 so that all the node coordinate information D186 of the nodes (N5 to N15) may be updated little by little. Obviously, it is possible to update the node coordinate information D186 of the other nodes N1 to N4 by expanding the error dispersion.

FIG. 15 shows an example of any one map Ma created through the map creation step S100x. The map Ma may include a node map and a border map Ba. The node map may include a plurality of first nodes (Na1 to Na99). The border map Ba may include a plurality of border information. The map Ma may include the map information D10 corresponding to the map Ma.

The process (S100x) of creating any one map may be performed through the process of FIGS. 11 to 15. As the map creation step S100x is performed a plurality of times, a plurality of maps may be created. When a certain map creation condition is satisfied, the map creation step S100x may be set to be performed. The map creation condition may include a map initial creation condition that is satisfied when there is no pre-stored map of the moving-robot 100. When the map initial creation condition is satisfied, the initial map creation step (S100x) may be performed. The map creation condition may include a certain map addition creation condition. When the map addition creation condition is satisfied, an additional map may be created even though there is a pre-stored map of the moving-robot 100. When the map addition creation condition is satisfied, the additional map creation step (S100x) may be performed. The map creation condition is a condition in which one of the map initial creation condition and the map addition creation condition is satisfied.

The map addition creation condition may include the following time condition. It is possible to determine whether the time condition is satisfied, by comparing the current time information with the generation-time information of the pre-stored map. The time condition may be previously set to be satisfied when only the map(s) having generation-time in day which is relatively much different from the current time in day is(are) stored The time condition according to an example may be set to be satisfied when there is no map determined to have a generation-time in day belonging to a certain time range before and after the current time in day. For example, assuming that the current time in day is 1:00 pm and the certain time is 2 hours, the following may be achieved. It is determined whether there is a map having a generation-time in day within the range of 11:00 am to 3:00 pm which is the certain time range (2 hours) before and after the current time in day (1:00 pm). When there is no map having the generation-time in day within the range of 11:00 am to 3:00 pm, the time condition may be satisfied and the map addition creation condition may be satisfied.

The time condition according to another example may be set to be satisfied when there is no map determined to have a generation-time in day belonging to a certain time slot in day to which the current time in day belongs. In this case, a day may be previously set to be divided into a plurality of timeslots in day by a certain reference. For example, assuming that any one timeslot A of the plurality of timeslots in day divided by a certain reference ranges from 4 pm to 6 pm, the following may be achieved. When the current time in day is 4:40 pm and belongs to a time slot A, and there is no map having a generation-time in day belonging to the time slot A, the time condition may be satisfied and the map addition creation condition may be satisfied.

In addition, the time condition may be pre-set whether to be satisfied according to the current time in year and the generation-time in year of each of the plurality of maps. The generation-time in day of the plurality of maps may be adjusted respectively, based on the current time in year and the generation-time in year of each of the plurality of maps. Specifically, the generation-time in day of each map may be adjusted in consideration of the daylight time according to the current time in year. For example, when the current time in year belongs to the summer season, the generation-time in day of the map having the current time in year belonging to the winter season may be adjusted to the generation-time in day of the summer season having the illuminance most similar to a corresponding illuminance. Here, the adjusted generation-time in day may be an imaginary generation-time in day, and the adjustment amount may be changed as the current time in year is changed. In addition, the level of the adjustment amount according to the change of the current time may be set differently according to the latitude of the area where the moving-robot 100 is sold. This is to increase the success rate and accuracy of the location recognition on the map, by reflecting that the illuminance by the sunlight is changed even in the same time slot in day according to the time change in year.

The map addition creation condition may include a recognition failure condition. When any one of the time condition and the recognition failure condition is satisfied, the map addition creation condition may be set to be satisfied.

The recognition failure condition may be set to be satisfied when it is determined that the location recognition has failed. For example, when the recognition image information is compared with a plurality of image information of the chosen map, if there is no image information having a degree of similarity equal to or greater than a certain value, the recognition failure condition may be satisfied.

Meanwhile, in the map deletion step S70, any one of a plurality of maps may be deleted according to a certain deletion priority order. In some cases, two or more maps may be deleted in the map deletion step S70. When a certain map deletion condition is satisfied, the map deletion step S70 may be performed.

The map deletion condition may include a certain capacity condition. For example, the capacity condition may be set to be satisfied when it is determined that the capacity of the storage unit 150 is insufficient when additionally creating the map. As another example, the capacity condition may be set to be satisfied when the capacity of the storage unit 150 exceeds a certain value. When the capacity of the created plurality of maps becomes large and the certain capacity condition is satisfied, at least one of a plurality of maps may be deleted.

When the capacity condition is satisfied, the deletion priority order may be set based on at least one of the generation-time information and the location recognition success rate. Based on the generation-time information, a weight value may be set so that the map having the oldest creation year occupies the priority in the deletion priority order. In addition, as the location recognition success rate becomes higher in a state where a corresponding map is chosen, a weight value may be set so that a corresponding map can occupy a lower priority in the deletion priority order. On the other hand, as the location recognition failure rate becomes higher in a state where a corresponding map is chosen, a weight value may be set so that a corresponding map can occupy the priority in the deletion priority order. The weighting of the deletion priority order according to the location recognition success rate (location recognition failure rate) may be set to be performed only when a corresponding map is chosen a certain number of times or more.

In addition, when the capacity condition is satisfied, the deletion priority order may be set based on the current time in year and the generation-time in year of each map. For example, when comparing the current time in year with the generation-time in year of a corresponding map, as the difference in the amount of sunshine becomes larger, a weight value may be set so that a corresponding map may occupy the priority in the deletion priority order.

The weight of the deletion priority order based on the current time in year and the generation-time in year of each map may be set differently according to the latitude of the area where the moving-robot 100 is sold. For example, when the current time in year is July and the summer time based on Korea, the map(s) whose generation-time in year is the winter time such as December, January, and February may be set to have a relatively high deletion priority order, and the map(s) whose generation-time in year is the summer time such as June, July, and August may be set to have a relatively low deletion priority order.

The map deletion condition may include the recognition failure condition. When any one of the capacity condition and the recognition failure condition is satisfied, the map deletion condition may be set to be satisfied.

When it is determined that the location recognition has failed on the chosen map, the map deletion step S70 of deleting the map which has failed in the location recognition may be performed. When the recognition failure condition is satisfied, a first priority of the deletion priority order is the chosen map which has failed in the location recognition.

Figure 16:
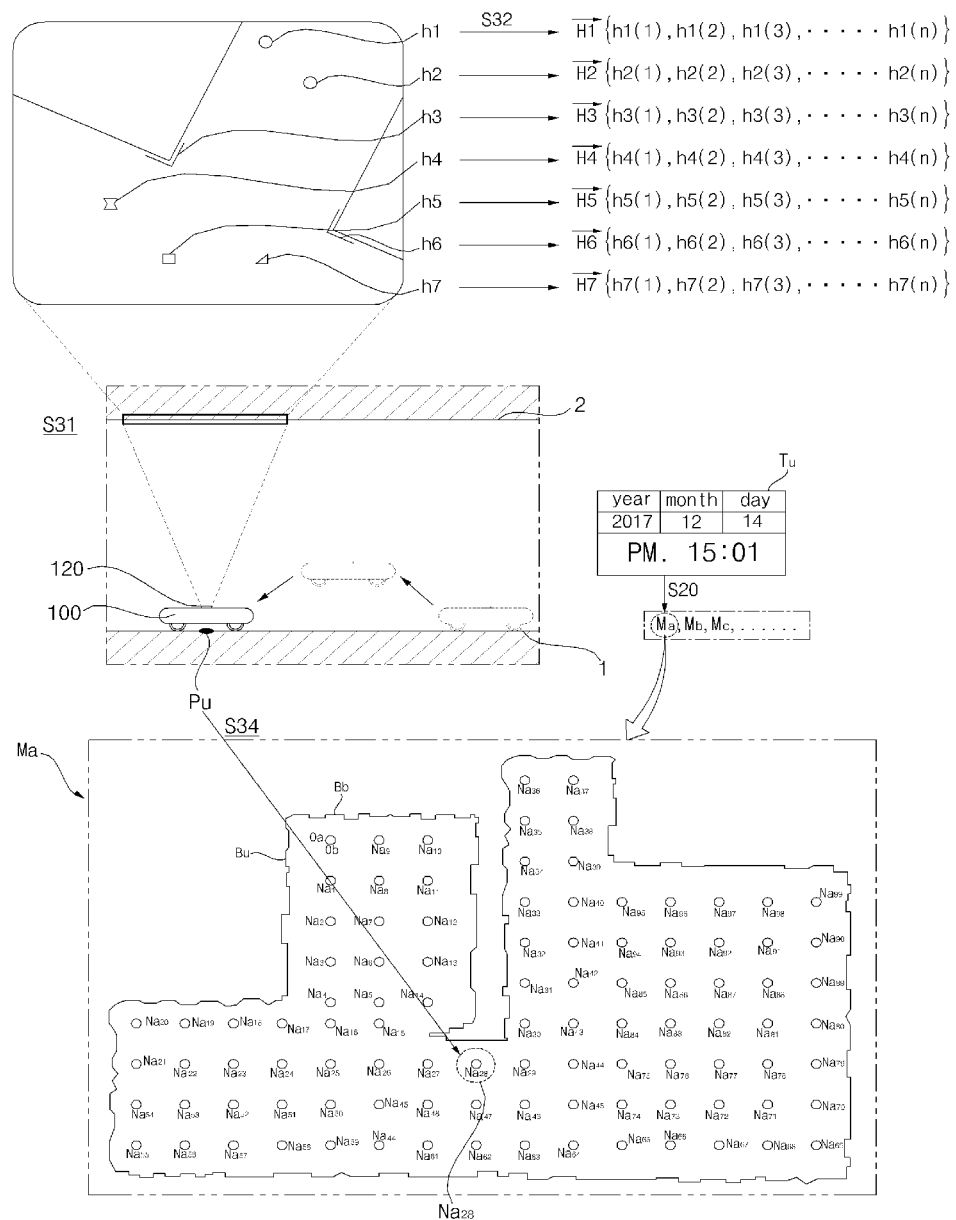
FIG. 16 is a conceptual diagram illustrating a map choosing process (S20), a recognition image acquisition process (S31), a recognition descriptor creation process (S32), and a node choosing process (S34) in the flowchart of FIG. 10.

Hereinafter, referring to FIG. 16, a specific example of the recognition processing step (S20, S30) will be described. Referring to FIG. 16, the map choosing step S20 will be described below. The current time information may be acquired at the point of time when the current point Pu of the moving-robot 100 becomes the unknown state due to the occurrence of the jumping situation. For example, the moving-robot 100 may include a timer for acquiring current time information, and may receive current time information from an external server or a terminal through the receiving unit 190.

Tu of FIG. 16 shows current time information. In the current time information Tu of FIG. 16, the current year is 2017, the current time in year is December(month) 14 (day), and the current time in day is PM. 15:01.

In the map choosing step S20, any one of a plurality of pre-stored maps can be chosen according to a certain map choosing algorithm. Several embodiments of the map choosing algorithm will be described below.

The map choosing algorithm according to a first embodiment may be set to choose a map that is determined to have a generation-time in day that is relatively close to the current time in day in comparison with the generation-time in day of other map. For example, a map having the generation-time in day closest to the current time in day may be chosen by comparing the current time information with the generation-time information of each of a plurality of maps. Here, in the case where a difference between the current time in day and the generation-time in day closest to the current time in day exceeds a certain value, a step of additionally creating a map without choosing any map may be performed.

The map choosing algorithm according to a second embodiment may be set to choose a map determined to have a generation-time in day belonging to a certain time slot in day to which the current time in day belongs. For example, a map choosing algorithm may be previously set so that a day is set to be divided into a plurality of time slot in day according to a certain reference, any one time slot in day A to which the current time in day belongs is chosen, and a generation-time in day belonging to the chosen time slot in day A is chosen. Here, in the case where there is no map having a generation-time in day belonging to the chosen time slot in day A, a step of additionally creating a map without choosing any map may be performed.

In addition, the map choosing algorithm may be set so that the map chosen according to the current time in year and the generation-time in year of each of the plurality of maps can be changed. For example, the map choosing algorithm may be set so that a plurality of maps having a difference between a current time in day and a generation-time in day when the difference is within a certain range may be chosen as a candidate group, and a map having a generation-time in year closest to the current time in year among a plurality of maps in the candidate group may be chosen.

As another example, the map choosing algorithm may be set so that a plurality of maps having a difference between a current time in year and a generation-time in year when the difference is within a certain range may be chosen as a candidate group, and a map having a generation-time in day closest to the current time in day among a plurality of maps in the candidate group may be chosen.

As another example, the generation-time in day of the plurality of maps may be adjusted, based on the current time in year and the generation-time in year of each of the plurality of maps. The map choosing algorithm may be set so that a map may be chosen based on the current time in day and the adjusted generation-time in day of each map. A specific example of the adjustment of generation-time in day is described above.

For example, when the adjustment of the generation-time in day is reflected in the map choosing algorithm according to the first embodiment, the map choosing algorithm may be set so that the adjusted generation-time in day of the chosen map may be relatively close to the current time in day in comparison with the adjusted generation-time in day of other map which is not chosen. As described above, through a combination of the above embodiments, various map choosing algorithms may be previously set.

In the example of FIG. 16, a map choosing step S20 is shown in which any one map Ma is chosen from among a plurality of maps (Ma, Mb, Mc, . . . ), based on each generation-time information of the current time information Tu and the pre-stored plurality of maps (Ma, Mb, Mc, . . . ).

Referring to FIG. 16, the location recognition step S30 will be described as follows. When the current point Pu of the moving-robot 100 becomes the unknown state due to the occurrence of the jumping situation, the recognition image acquisition step S31 may be started. The image acquisition unit 120 may acquire the recognition image at the unknown current point Pu. The recognition image may be photographed toward the upper side of the moving-robot 100. The recognition image may be a picture of the ceiling 2. The image shown in FIG. 16 may be a recognition image corresponding to the current point Pu.

Referring to FIG. 16, in the recognition descriptor creation process S32, a plurality of recognition descriptors ($\vec{H1}$, $\vec{H2}$, $\vec{H3}$, . . . , $\vec{H7}$) may be created based on a plurality of recognition feature points (h1, h2, h3, . . . , h7) extracted from the recognition image. The recognition feature point (h1, h2, h3, . . . , h7) may achieve one-to-one correspondence to a plurality of recognition descriptors ($\vec{H1}$, $\vec{H2}$, $\vec{H3}$, . . . , $\vec{H7}$).

In FIG. 16, $\vec{H1}$, $\vec{H2}$, $\vec{H3}$, . . . , $\vec{H7}$ denotes an n-dimensional vector. h1(1), h1(2), h1(3), . . . , h1($n$) in a brace { } of $\vec{H1}$ denotes the numerical value of each dimension forming $\vec{H1}$. Since the notation for the rest $\vec{H2}$, $\vec{H3}$, . . . , $\vec{H7}$ has the same method, a description thereof is omitted.

A plurality of recognition descriptors ($\vec{H1}$, $\vec{H2}$, $\vec{H3}$, . . . , $\vec{H7}$) corresponding to a plurality of recognition feature points (h1, h2, h3, . . . , h7) may be created, by using a SIFT technology for feature detection. Various methods for detecting features from an image in the field of computer vision technology and various feature detectors suitable for the detection of these features are described above.

In the comparison process S33, it is possible to compare the recognition image information including a plurality of recognition descriptors ($\vec{H1}$, $\vec{H2}$, $\vec{H3}$, . . . , $\vec{H7}$) and a plurality of image information corresponding to a plurality of nodes (Na1 to Na99) on the chosen map Ma. In the comparison process S33, any one of various known methods may be used.

FIG. 16 shows the success in the location recognition based on the result of the comparison process S33. As a result of the comparison process S33, the node Na28 corresponding to the image having the highest similarity may be chosen as a final node.

As described above, according to the present invention, it is possible to improve the success rate and the accuracy of location recognition by creating a plurality of maps having different generation-time information and performing location estimation based on the generation-time information and the current time information.

By choosing any one of a plurality of maps based on the generation-time in day and the current time in day, it is possible to recognize the current location with a high accuracy despite the change in illuminance in the driving area, by considering the fact that the illuminance of the driving area changes in a periodic pattern according to the time in day.

By choosing of any one of a plurality of maps by reflecting the generation-time in year and the current time in year, it is possible to recognize the current location with a more high accuracy, by reflecting the fact that the illuminance caused by the sunlight can be changed even in the case of the same time slot in day as the time in year is changed.

Through the map addition creation condition, it is possible to efficiently divide a time when creating the map and a time when using the existing map, through a map creation control. Through the map deletion step, it is possible to prevent the infinite increase in the number of stored maps, thereby helping efficient use of the memory (storage unit), and removing a map having a low usability or low accuracy. Accordingly, the accuracy of map recognition can be further enhanced.

By creating the map based on the environmental information differently detected according to the illumination change, two environmental information acquired in a state where all other conditions are the same in a different generation-time in year. Accordingly, when the location recognition is attempted based on the environmental information in the map created at the generation-time in day close to the current time in day, the success rate and accuracy of the location recognition can be further enhanced.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

A first object of the present invention is to provide an efficient and accurate location recognition technology in a driving area by increasing the success rate of recognition of the current location of a moving-robot and estimating the current location with higher reliability.

In the above-described related art, in comparison of an image acquired by photographing the same portion on the same driving area with a recognition image, there is a problem that the estimation accuracy of the current location may be changed as the illumination in the driving area is turned on/off, or as the illumination is changed depending on the incident angle or amount of sunlight. A second object of the present invention is to solve this problem.

In addition, as the feature point itself extracted from the image of a ceiling is changed according to the illumination change in the driving area, when a difference between the time of creating a map through the image of the driving area and the time of estimating the current location is large, there is a problem that the location recognition may be unsuccessful or the possibility of false recognition may be increased. A third object of the present invention is to solve such a problem.

In order to solve the above problems, a solution of the present invention is to provide a moving-robot technology for performing a location recognition estimation in consideration of the illumination change based on information on generation-time of a map of a driving area and information on current time of performing location recognition.

In accordance with an aspect of the present invention, a method of controlling a moving-robot includes: a step(a) of creating a plurality of maps having different generation-time information through a plurality of driving processes; and a step(b) of choosing any one of the plurality of maps according to a certain map choosing algorithm based on current time information and the generation-time information, and attempting location recognition on the chosen map.

The map choosing algorithm is set to choose a map having generation-time in day which is relatively close to current time in day in comparison with generation-time in day of other map. The map choosing algorithm is set to choose a map having generation-time in day belonging to a certain time slot in day to which current time in day belongs.

The map choosing algorithm is set in such a manner that a different map is chosen according to current time in year and each generation-time in year of the plurality of maps. The map choosing algorithm is set in such a manner that each generation-time in day of the plurality of maps is adjusted based on the current time in year and each generation-time in year of the plurality of maps, and a map is chosen based on current time in day and the adjusted generation-time in day.

The step(a) includes: an initial map creation step of creating a map through a driving process when it is determined that there is no pre-stored map; and an additional map creation step of creating a map through a driving process when it is determined that a certain map addition creation condition is satisfied, when it is determined that there is a pre-stored map.

The map addition creation condition includes a time condition set to be satisfied when there is no map determined to have generation-time in day belonging to a certain time range before and after current time in day. The map addition creation condition includes a time condition set to be satisfied when there is no map determined to have generation-time in day belonging to a certain time slot in day to which current time in day belongs. The time condition is set to be satisfied depending on current time in year and each generation-time in year of the plurality of maps.

The map addition creation condition includes a recognition failure condition that is set to be satisfied when it is determined that the location recognition has failed in the step (b).

The control method further includes an additional map creation step of creating a map through a driving process, when it is determined in the step (b) that the location recognition has failed.

The control method further includes a map deletion step of deleting any one of the plurality of maps according to a certain deletion priority order, when a capacity of created plurality of maps becomes larger and a certain capacity condition is satisfied.

The deletion priority order is set based on at least one of generation-time information and location recognition success rate. The control method further includes a map deletion step of deleting a map which has failed in the location recognition, when the recognition failure condition is satisfied as it is determined in the step(b) that the location recognition has failed.

The step(a) includes acquiring environmental information that varies depending on illuminance, and creating the map based on the acquired environmental information. The acquired environmental information includes an external image.

In accordance with another aspect of the present invention, a moving-robot includes: a main body; a driving unit configured to move the main body; an environmental information acquisition unit configured to acquire environmental information that varies depending on illuminance during driving; and a controller configured to create a plurality of maps having different generation-time information based on environmental information acquired respectively in a plurality of driving processes at different points of time, compare current time point with the generation-time information to choose any one of the plurality of maps, and control to recognize location on the chosen map.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a moving robot, the method comprising:
   creating, by a controller, a plurality of maps having respective different generation times through a plurality of driving processes by the moving robot; and
   choosing, by the controller, one of the plurality of maps based on a current time and the generation times of the maps, and recognizing, by the controller, a location of the moving robot using the chosen map,
   wherein choosing the one of the plurality of maps based on the current time and the generation times of the maps includes choosing the one of the maps having one of the generation times with a time of day that is closest to a time of day of the current time.

2. The method of claim 1, wherein choosing the one of the plurality of maps based on the current time and the generation times of the maps includes choosing one of the maps having one of the generation times associated with a time of day slot corresponding to a time of day of the current time.

3. The method of claim 1, wherein choosing the one of the plurality of maps based on the current time and the generation times of the maps includes choosing one of the maps having one of the generation times corresponding to a time of year corresponding to a time of year of the current time.

4. The method of claim 3, wherein the time of day for one or more of the generation times of the plurality of maps is adjusted based on the time of year for the current time, and the map is chosen based on a time of day for the current time and the adjusted time of the day for the generation times.

5. The method of claim 1, wherein creating the plurality of maps includes:
   creating a map through a driving process when there is no pre-stored map for the moving robot; and
   creating a map through a driving process when a map addition creation condition is triggered and there is a pre-stored map.

6. The method of claim 5, wherein the map addition creation condition is triggered when time of day for none of the generation times of the maps is included in a time range around the time of day for the current time.

7. The method of claim 5, wherein the map addition creation condition is triggered when time of day for none of the generation times for the maps is included a time slot associated with a time of day for the current time.

8. The method of claim 5, wherein the map addition creation condition is selectively triggered based on a time of year of the current time and the times of year for the generation times of the plurality of maps.

9. The method of claim 1, further comprising:
creating another map through a driving process, when the location recognition of the moving robot using the chosen map has failed.

10. The method of claim 1, further comprising:
deleting at least one of the plurality of maps according to a deletion priority order, when a quantity of created plurality of maps exceeds a threshold and a capacity condition is satisfied.

11. The method of claim 10, wherein the deletion priority order is set based on at least one of the generation times for the plurality of maps or location recognition success rates for the plurality of maps.

12. The method of claim 1, further comprising:
deleting one of the plurality of maps when a location recognition of the moving robot using the one of the plurality of maps has failed.

13. The method of claim 1, wherein creating the plurality of maps includes:
acquiring environmental information that varies depending on illuminance, and creating one or more of the maps based on the acquired environmental information.

14. A moving robot comprising:
a main body;
a motor is selectively driven to move the main body;
a sensor to acquire environmental information that varies depending on illuminance during driving of the motor; and
a controller to:
create a plurality of maps having different generation times based on the environmental information acquired respectively in a plurality of driving processes at different points of time,
compare a current time with the generation times to choose one of the plurality of maps, and
use the chosen map to recognize a location of the moving robot.

15. The moving robot of claim 14, wherein the controller, when comparing the current time with the generation times to choose the one of the plurality of maps, is further to choose a map, of the plurality of maps, having of the generation times with a time of day which is closest to a time of day of the current time.

16. The moving robot of claim 14, wherein the controller, when comparing the current time with the generation times to choose the one of the plurality of maps, is further to choose a map, of the plurality of maps, having a time of day of the generation times belonging to a time slot in day corresponding to a time of day of the current time.

17. The moving robot of claim 14, wherein the controller, when comparing the current time with the generation times to choose the one of the plurality of maps, is further to the map from the plurality of maps according to a time of year of the current time and times of year of the generation times.

18. The moving robot of claim 14, wherein the controller is further to adjust the time of day for one or more of the generation times of the plurality of maps based on a time of year of the current time and times of years of the generation times, the one of the plurality of maps being chosen based on the time of day for the current time and the adjusted times of day for the generation times of the plurality of maps.

19. The moving robot of claim 14, wherein the controller is further to delete one of the plurality of maps according to a deletion priority order when a quantity of plurality of maps exceeds a threshold and a capacity condition is satisfied.

* * * * *